US011937131B2

(12) United States Patent
Da Silva et al.

(10) Patent No.: US 11,937,131 B2
(45) Date of Patent: Mar. 19, 2024

(54) RESUME REQUEST FOLLOWED BY RELEASE AND REDIRECT

(71) Applicant: TELEFONAKTIEBOLAGET LM ERICSSON (PUBL), Stockholm (SE)

(72) Inventors: Icaro Leonardo J. Da Silva, Solna (SE); Oscar Ohlsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/591,994

(22) Filed: Feb. 3, 2022

(65) Prior Publication Data
US 2022/0159518 A1 May 19, 2022

Related U.S. Application Data

(63) Continuation of application No. 16/489,434, filed as application No. PCT/SE2019/050627 on Jun. 27, 2019.
(Continued)

(51) Int. Cl.
*H04W 36/00* (2009.01)
*H04W 8/08* (2009.01)
(Continued)

(52) U.S. Cl.
CPC .......... *H04W 36/0011* (2013.01); *H04W 8/08* (2013.01); *H04W 36/04* (2013.01);
(Continued)

(58) Field of Classification Search
CPC ... H04W 36/0011; H04W 8/08; H04W 36/04; H04W 36/08; H04W 76/10; H04W 76/27; H04W 76/30; H04W 76/16; H04W 76/19
See application file for complete search history.

(56) References Cited

U.S. PATENT DOCUMENTS

2017/0332424 A1 11/2017 Salot et al.
2018/0152924 A1 5/2018 Ouchi
(Continued)

FOREIGN PATENT DOCUMENTS

CA 3057043 A1 * 9/2018 ............ H04W 24/04
CN 107079509 A 8/2017
(Continued)

OTHER PUBLICATIONS

Author Unknown, "Technical Specification Group Services and System Aspects; Procedures for the 5G System; Stage 2 (Release 15)," Technical Specification 23.502, Version 15.3.0, 3GPP Organizational Partners, Sep. 2018, 330 pages.
(Continued)

*Primary Examiner* — Omar J Ghowrwal
(74) *Attorney, Agent, or Firm* — Withrow & Terranova, PLLC

(57) ABSTRACT

Methods and systems for resume request followed by release and redirect are herein provided. According to one aspect, a method performed by a User Equipment for communicating within a telecommunications network comprises: while in a Radio Resource Control (RRC) INACTIVE state, sending, to a base station, a request to resume communication, and, without entering an RRC CONNECED state, receiving, from the base station, an instruction to release and redirect; and in response to receiving the instruction to release and redirect, performing cell selection in a Radio Access Technology and attempting to establish or resume communication with the selected cell.

8 Claims, 20 Drawing Sheets

Related U.S. Application Data

(60) Provisional application No. 62/736,332, filed on Sep. 25, 2018.

(51) Int. Cl.

| | | |
|---|---|---|
| *H04W 36/04* | (2009.01) | |
| *H04W 36/08* | (2009.01) | |
| *H04W 76/10* | (2018.01) | |
| *H04W 76/27* | (2018.01) | |
| *H04W 76/30* | (2018.01) | |
| H04W 76/19 | (2018.01) | |

(52) U.S. Cl.
CPC .......... *H04W 36/08* (2013.01); *H04W 76/10* (2018.02); *H04W 76/27* (2018.02); *H04W 76/30* (2018.02); *H04W 76/19* (2018.02)

(56) References Cited

U.S. PATENT DOCUMENTS

| | | | |
|---|---|---|---|
| 2018/0167911 A1 | 6/2018 | Kota et al. | |
| 2018/0220486 A1 | 8/2018 | Tseng et al. | |
| 2018/0270682 A1 | 9/2018 | Zacharias et al. | |
| 2020/0053818 A1* | 2/2020 | Sillanpaa | H04W 76/27 |
| 2020/0404564 A1 | 12/2020 | Kim et al. | |
| 2021/0176656 A1* | 6/2021 | Sang | H04W 24/10 |

FOREIGN PATENT DOCUMENTS

| | | |
|---|---|---|
| CN | 108076536 A | 5/2018 |
| RU | 2667379 C2 | 9/2018 |
| WO | 2017118758 A1 | 7/2017 |
| WO | 2017135779 A1 | 8/2017 |
| WO | 2018128020 A1 | 7/2018 |
| WO | 2018130889 A1 | 7/2018 |

OTHER PUBLICATIONS

Author Unknown, "Technical Specification Group Core Network and Terminals; Non-Access-Stratum (NAS) protocol for 5G System (5GS); Stage 3 (Release 15)," Technical Specification 24.501, Version 15.1.0, 3GPP Organizational Partners, Sep. 2018, 398 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.2.0, 3GPP Organizational Partners, Jun. 2018, 357 pages.
Author Unknown, "Technical Specification Group Radio Access Network; Evolved Universal Terrestrial Radio Access (E-UTRA); User Equipment (UE) procedures in idle mode (Release 15)," Technical Specification 36.304, Version 15.0.0, 3GPP Organizational Partners, Jun. 2018, 52 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.2.2, 3GPP Organizational Partners, Jun. 2018, 791 pages.
Author Unknown, "Technical Specification Group Radio Access Network; NR; NR and NG-RAN Overall description; Stage 2 (Release 15)," Technical Specification 38.300, Version 15.2.0, 3GPP Organizational Partners, Jun. 2018, 87 pages.
Author Unknown, "Technical Specification Group Radio Access Network; NR; User Equipment (UE) procedures in Idle mode and RRC Inactive state (Release 15)," Technical Specification 38.304, Version 15.0.0, 3GPP Organizational Partners, Jun. 2018, 25 pages.
Author Unknown, "Technical Specification Group Radio Access Network; NR; Radio Resource Control (RRC) protocol specification (Release 15)," Technical Specification 38.331, Version 15.2.1, 3GPP Organizational Partners, Jun. 2018, 303 pages.
Examination Report for Indian Patent Application No. 202147018532, dated Feb. 10, 2022, 5 pages.
Intention to Grant for European Patent Application No. 20202556.5, dated Feb. 2, 2022, 5 pages.
Non-Final Office Action for U.S. Appl. No. 16/489,434, dated Feb. 2, 2022, 16 pages.
Ericsson, "RRC state machine and RRC_Inactive characteristics," Tdoc R2-1700535, 3GPP TSG-RAN WG2 :1dhoc, Jan. 17-19, 2017, Spokane, USA, 11 pages.
Ericsson, "Summary of Agreements of Connection Control" R2-1805352, 3GPP TSG-RAN WG2 #101bis, Apr. 16-20, 2018, Sanya, P.R. of China, 16 pages.
Saily, M. et al., "Deliverable D6.2: 5G Asynchronous Control Functions and Overall Control Plane Design," Version 1.0, METIS-II Project, Apr. 30, 2017, 5GPPP, 167 pages.
International Search Report and Written Opinion for International Patent Application No. PCT/SE2019/050627, dated Oct. 17, 2019, 14 pages.
Intention to Grant for European Patent Application No. 19737268.3, dated Aug. 26, 2020, 5 pages.
Extended European Search Report for European Patent Application No. 20202556.5, dated Apr. 23, 2021, 6 pages.
Official Action for Russian Patent Application No. 2021111463/07, dated Sep. 14, 2021, 10 pages.
Mediatek Inc., "R2-1811287: [N016] Add missing SSB info in RRC Release with redirection," 3GPP TSG-RAN WG2 #103, Aug. 20-24, 2018, Gothenburg, Sweden, 5 pages.
Final Office Action for U.S. Appl. No. 16/489,434, dated May 4, 2022, 16 pages.
Ericsson, "R2-1813492: Introduction of SA," 3GPP TSG-WG2 #103, Aug. 20-24, 2018, Gothenburg, Sweden, 483 pages.
Intel Corporation, "R2-1809795: Open issues on RRC connection release message," 3GPP TSG-RAN WG2 NR AH Meeting 1807, Jul. 2-6, 2018, Montreal, Canada, 8 pages.
Notice of Reasons for Refusal for Japanese Patent Application No. 2021-510942, dated May 13, 2022, 6 pages.
Advisory Action for U.S. Appl. No. 16/489,434, dated Jul. 21, 2022, 3 pages.
Non-Final Office Action for U.S. Appl. No. 16/489,434, dated Aug. 30, 2022, 19 pages.
Final Office Action for U.S. Appl. No. 16/489,434, dated Dec. 19, 2022, 17 pages.
Huawei, et al., "R2-1803250: Remaining issues on State transition between RRC Connected and Inactive," 3GPP TSG-RAN WG2 Meeting #101, Feb. 26-Mar. 2, 2018, Athens, Greece, 5 pages.
OPPO, "R2-1804555: Discussion on RRC Resume procedure from inactive to inactive or idle," 3GPP TSG-RAN2#101bis, Apr. 16-20, 2018, Sanya, China, 3 pages.
First Office Action for Chinese Patent Application No. 201980062426.0, dated Sep. 21, 2023, 8 pages.
Office Action for Colombian Patent Application No. NC2021/0004048, dated Oct. 31, 2023, 22 pages.

* cited by examiner

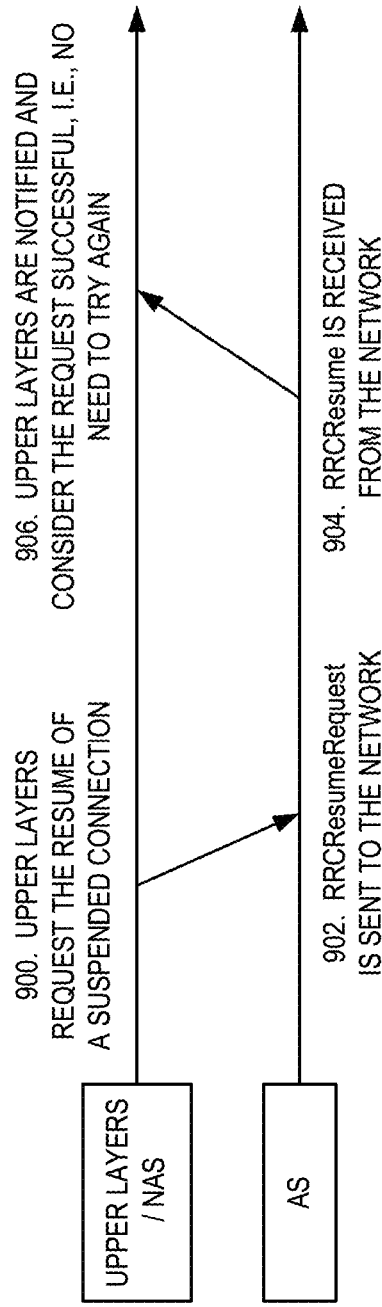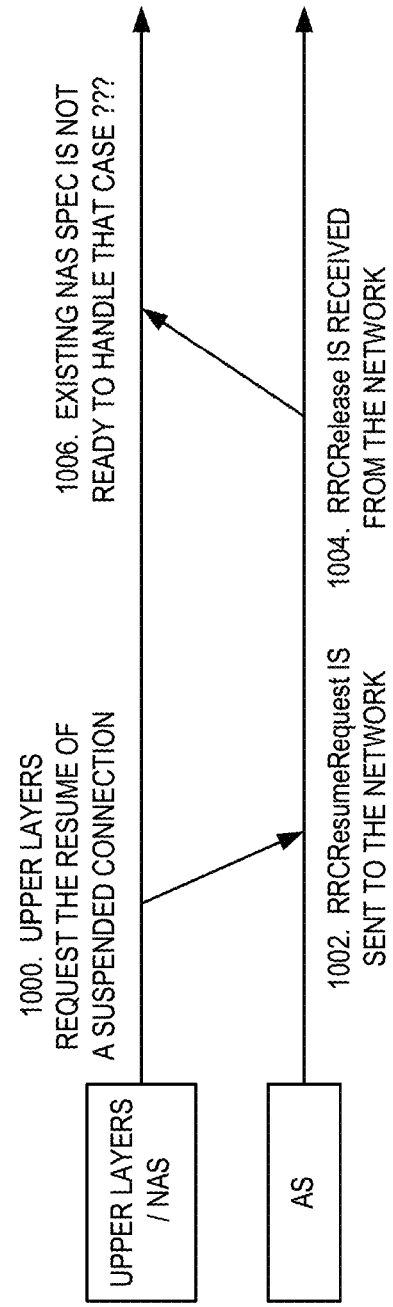

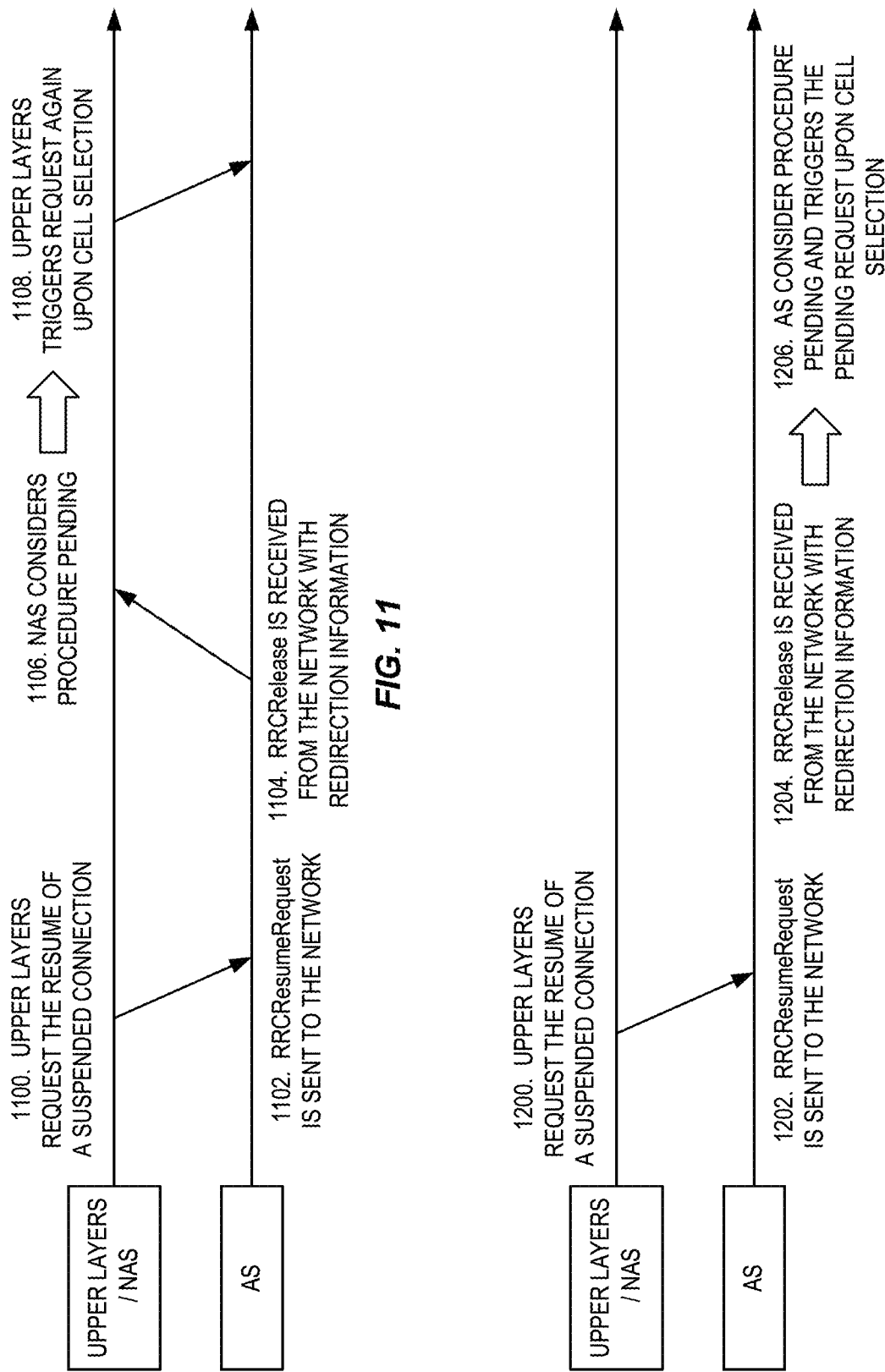

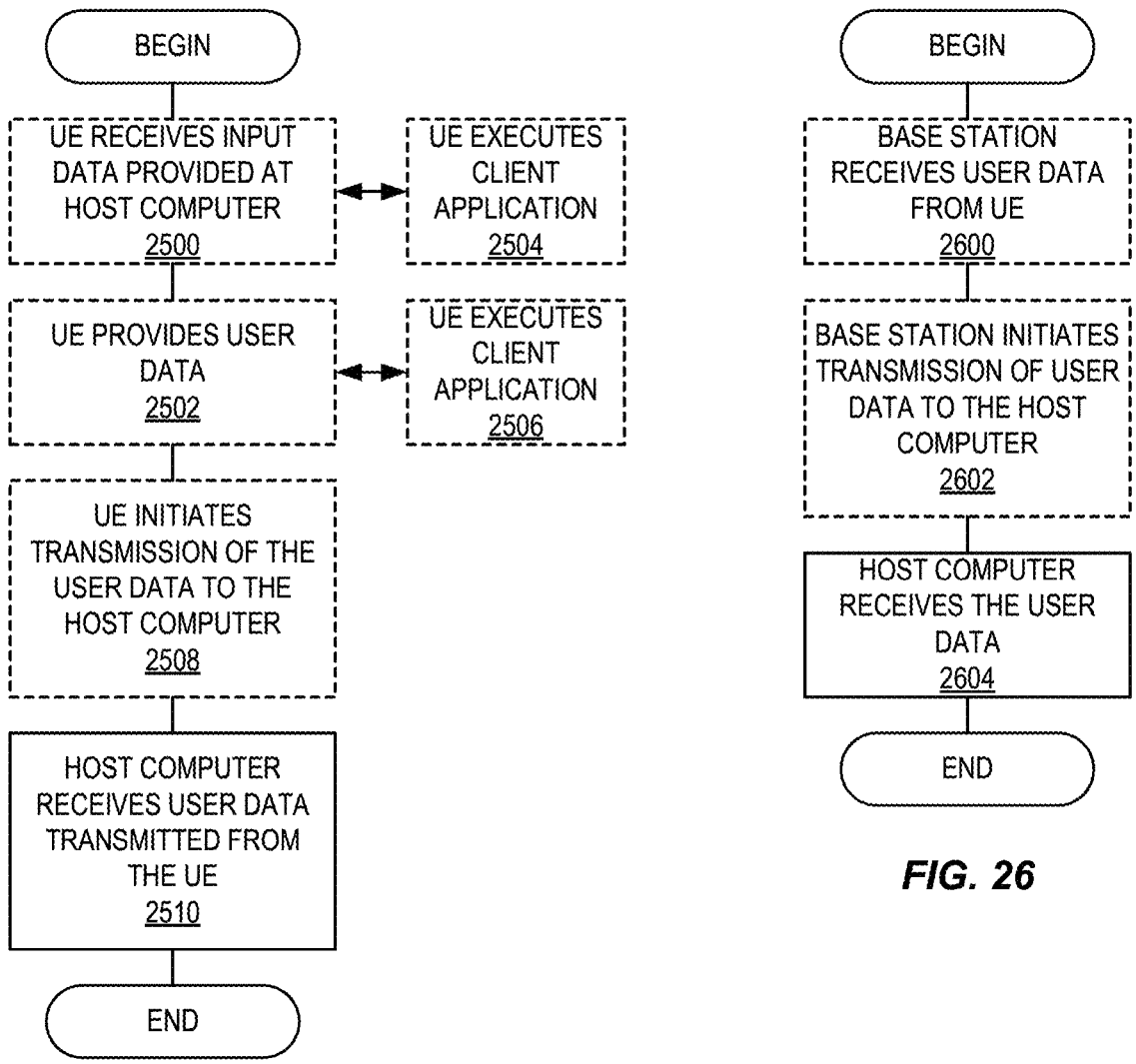

RESUME REQUEST FOLLOWED BY RELEASE AND REDIRECT

RELATED APPLICATIONS

The present application is a continuation application of U.S. patent application Ser. No. 16/489,434, filed on Aug. 28, 2019, which is a U.S. National Stage Filing of PCT Application No. PCT/SE2019/050627, filed on Jun. 27, 2019 which claims the benefit of provisional patent application Ser. No. 62/736,332, filed Sep. 25, 2018, the disclosure of which is hereby incorporated herein by reference in its entirety.

TECHNICAL FIELD

This application relates to methods and systems for handling a resume request followed by a release and redirect in a manner that obviates the need for the User Equipment (UE) to first enter a connected mode.

BACKGROUND

Long Term Evolution (LTE) defines the status of a User Equipment (UE) in terms of Radio Resource Control (RRC) states and Connection Management (CM) states.
 In the RRC_IDLE state, a UE is known to the Evolved Packet Core (EPS) and has an Internet Protocol (IP) address, but is not known to a particular base station such as an evolved or enhanced Node B (eNB).
 In the RRC_CONNECTED state, the UE is known to both the EPC and the eNB.
 In the CM-IDLE state, no Non-Access Stratum (NAS) signaling connection exists between the UE and the network. There is no context for the UE in the eNB. The UE is not connected to a Mobility Management Entity (MME).
 In the CM-CONNECTED state, a NAS signaling connection exists and the UE location is known to the MME, which coordinates handover and other mobility-related procedures.

As used herein, a UE in the RRC_IDLE state may be referred to as a "RRC_IDLE UE," a UE in the RRC_CONNECTED state may be referred to as a "RRC_CONNECTED UE," and so forth.

LTE—Suspend and Resume

In LTE Release 13 (Rel-13) a mechanism was introduced for a UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits, such as reducing latency, e.g., for smart phones accessing Internet, and reduced battery consumption, especially for machine type devices sending very little data. The Rel-13 solution describes a process wherein the UE sends an RRCConnectionResumeRequestmessage to the network and in response receives an RRCConnectionResume from the network. The RRCConnectionResume is not encrypted but integrity protected.

NR—RRC_INACTIVE

In LTE Release 15 (Rel-15), which is also called enhanced LTE (eLTE) or LTE connected to Fifth Generation (5G) Core Network (NGC), and in New Radio (NR), as part of the standardized work on 5G NR in the Third Generation Partnership Project (3GPP), it has been decided that NR should support an RRC_INACTIVE state with some similar properties as the suspended state in LTE Rel-13. The RRC_INACTIVE has slightly different properties from the LTE state in that it is a separate RRC state and not part of RRC_IDLE as in LTE. Additionally, the Core Network (CN)/Radio Access Network (RAN) connection (NG or N2 interface) is kept for RRC_INACTIVE while it was suspended in LTE.

FIG. 1 illustrates a UE state machine and possible state transitions between the RRC states in NR. The properties of the states in FIG. 1 are as follows:
 RRC_IDLE. A UE specific Discontinuous Reception (DRX) may be configured by upper layers. The UE controls mobility based on network configuration. The UE monitors a Paging channel for CN paging using a 5G System Architecture Evolution (SAE) Temporary Mobile Subscriber Identity (5G-S-TMSI), performs neighboring cell measurements and cell (re-)selection, and acquires system information.
 RRC_INACTIVE. A UE specific DRX may be configured by upper layers or by RRC layer. The UE controls mobility based on network configuration. The UE stores the Access Stratum (AS) context. The UE monitors a Paging channel for CN paging using 5G-S-TMSI and RAN paging using an Inactive Radio Network Temporary Identifier (I-RNTI), performs neighboring cell measurements and cell (re-)selection, performs RAN-based notification area updates periodically and when moving outside the RAN-based notification area, and acquires system information.
 RRC_CONNECTED. The UE stores the AS context. Transfer of unicast data to/from UE occurs. At lower layers, the UE may be configured with a UE specific DRX. For UEs supporting Carrier Aggregation (CA), one or more Secondary Cells (SCells) may be aggregated with the Special Cell (SpCell) or Primary Cell (PCell) for increased bandwidth. For UEs supporting Dual Connectivity (DC), one Secondary Cell Group (SCG) may be aggregated with the Master Cell Group (MCG) for increased bandwidth. Network controlled mobility, i.e., handover within NR and to/from Evolved Universal Terrestrial Radio Access Network (E-UTRAN) is supported. The UE monitors a Paging channel, monitors control channels associated with the shared data channel to determine if data is scheduled for it, provides channel quality and feedback information, performs neighboring cell measurements and measurement reporting, and acquires system information.

FIG. 1 illustrates possible state transitions between the RRC_IDLE, RRC_CONNECTED, and RRC_INACTIVE states. In FIG. 1, these transitions are as follows:

| Number | Action | From State | To State |
| --- | --- | --- | --- |
| 100 | Establish | RRC_IDLE | RRC_CONNECTED |
| 102 | Release [and redirect] | RRC_CONNECTED | RRC_IDLE |
| 104 | Release (Suspend) [and redirect] | RRC_CONNECTED | RRC_INACTIVE |
| 106 | Resume | RRC_INACTIVE | RRC_CONNECTED |
| 108 | Release | RRC_INACTIVE | RRC_IDLE |

State transition 102, "release [and redirect]," is so named because a UE may be released with or without being redirected to another frequency or Radio Access Technology (RAT).

Release and Redirect Feature

In LTE, according to the 3GPP Technical Specification (TS) 36.331, the release and redirect feature is used to release an RRC_CONNECTED UE to RRC_IDLE and redirect it to another frequency, either in the same RAT or in a different RAT. Hereinafter, a TS is presumed to be a 3GPP TS unless otherwise specified.

During the 3GPP Radio Access Network, Layer 2 (RAN2) working group meeting RAN2 #99 in Berlin, the "release and redirect" and "cell reselection priorities upon release" (named mobility control info in LTE) functionalities were agreed for NR:

Agreement 11: it was agreed that the RRC Connection Release kind of message can include cause information, redirect carrier frequency, and idle mode mobility control information.

Agreement 27: it was agreed that, for CONNECTED to INACTIVE RRC transition, the RRC Connection Release kind of message includes (a) the same information as listed in agreement 11 (i.e., cause information, redirect carrier frequency and mobility control information), and can include (b) UE identity (or UE context identity), and optionally (c) suspension/inactivation indication (FFS if implicitly or explicitly), (d) RAN configured DRX cycle, (e) RAN periodic notification timer, and (f) RAN notification area.

These proposals have been specified in the RRC specification (TS 38.331) and in the Idle/Inactive mode (TS 38.304) specifications. In RRC (TS 38.331), the RRCRelease message is used to move the UE from RRC_CONNECTED to RRC_IDLE or from RRC_CONNECTED to RRC_INACTIVE. The release and redirect feature is then activated when the field redirectedCarrierInfo is included in the RRCRelease message. An excerpt from TS 38.331 is reproduced below, with the pertinent additions shown in bold font.

Begin Excerpt from RRC TS 38.331

RRCRelease Message

| RRCRelease field descriptions |
| --- |
| cnType |
| Indicate that the UE is redirected to EPC or 5GC. |
| deprioritisationReq |
| Indicates whether the current frequency or RAT is to be de-prioritised. The UE shall be able to store a deprioritisation request for up to X frequencies (applicable when receiving another frequency specific deprioritisation request before T325 expiry). |
| deprioritisationTimer |
| Indicates the period for which either the current carrier frequency or NR is deprioritised. Value minN corresponds to N minutes. |
| suspendConfig |
| Indicates configuration for the RRC_INACTIVE state. |
| t380 |
| Refers to the timer that triggers the periodic RNAU procedure in UE. Value min5 corresponds to 5 minutes, value min10 corresponds to 10 minutes and so on. |
| ran-PagingCycle |
| Refers to the UE specific cycle for RAN-initiated paging. Value rf32 corresponds to 32 radio frames, rf64 corresponds to 64 radio frames and so on. |
| redireetedCarrierInfo |
| Indicates a carrier frequency (downlink for FDD) and is used to redirect the UE to an NR or an inter-RAT carrier frequency, by means of the cell selection upon leaving RRC_CONNECTED as specified in TS 38.304 [20]. |

End Excerpt from RRC 38.331

According to TS 38.304, the following UE behavior is specified upon the reception of the field redirectedCarrierInfo.

On transition from RRC_CONNECTED to RRC_IDLE state or RRC_INACTIVE state, the UE shall attempt to camp on a suitable cell according to redirectedCarrierInfo (i.e., a cell having the specified carrier frequency) if redirectedCarrierInfo is included in the RRC message used for this transition. If the UE cannot find a suitable cell, the UE is allowed to camp on any suitable cell of the indicated RAT. If the RRC Release message does not contain the redirectedCarrierInfo, UE shall attempt to select a suitable cell on a NR carrier. If no suitable cell is found according to the above, the UE shall perform cell selection using stored information in order to find a suitable cell to camp on.

When returning to RRC_IDLE state after UE moved to RRC_CONNECTED state from camped on any cell state, UE shall attempt to camp on an acceptable cell according to redirectedCarrierInfo, if included in the RRC Release message. If the UE cannot find an acceptable cell, the UE is allowed to camp on any acceptable cell of the indicated RAT. If the RRC Release message does not contain redirected-

```
...
RRCRelease-IEs ::= SEQUENCE {
    redirectedCarrierInfo       RedirectedCarrierInfo     OPTIONAL,  -- Need N
    cellReselectionPriorities   CellReselectionPriorities OPTIONAL,  -- Need R
    suspendConfig               SuspendConfig             OPTIONAL,  -- Need R
    deprioritisationReq         SEQUENCE {
        deprioritisationType        ENUMERATED {frequency, nr},
        deprioritisationTimer       ENUMERATED {min5, min10, min15, min30}
    }                                                     OPTIONAL,  -- Need N
    lateNonCriticalExtension    OCTET STRING              OPTIONAL,
    nonCriticalExtension        SEQUENCE{ }               OPTIONAL
}
RedirectedCarrierInfo-EUTRA ::= SEQUENCE {
    eutraFrequency              ARFCN-ValueEUTRA,
    cnType-r15                  ENUMERATED {epc,fiveGC} OPTIONAL
}
...
```

CarrierInfo UE shall attempt to select an acceptable cell on a NR carrier. If no acceptable cell is found according to the above, the UE shall continue to search for an acceptable cell of any PLMN in state any cell selection.

Radio Network Subsystem Application Part User Adaption (RNA) Update Procedure

In RAN2 #99bis in Prague, it has been agreed that for RAN area updates, an RRCResumeRequest may be responded by the network with an RRCRelease, possibly containing redirection information:
Agreement 3: a UE in the INACTIVE state, trying to resume an RRC connection, can receive MSG4 sent over SRB1 with at least integrity protection to move the UE back into the INACTIVE state (i.e., not rejected). (RNA update use case)
Agreement 4: the MSG4 (i.e., not rejected) of agreement 3 can configure at least the same parameters as can be configured by the message that moves the UE to the INACTIVE state (e.g., I-RNTI, RNA, RAN DRX cycle, periodic RNAU timer, redirect carrier frequency, for inactive mode mobility control information or reselection priority information). (security framework are to be discussed independently)
Agreement 5: a UE in the INACTIVE state, trying to resume the RRC connection, can receive MSG4 sent over SRB1 with at least integrity protection to move the UE into the IDLE state.

Conventional RRCRelease without Redirect

FIG. 2 illustrates a conventional Radio Network Subsystem Application Part User Adaption (RNA) Update procedure. FIG. 2 describes the UE-triggered RNA update procedure when a UE in the RRC_INACTIVE state moves out of the configured RNA involving context retrieval over the Xn interface. Because the release does not involve a redirect, this procedure can be performed by the UE without entering the RRC_CONNECTED state. At step 200, the UE issues an RRCResumeRequest indicating that this is for an RNA update. The New Radio Base Station (gNB) that receives this request retrieves the UE context from the last serving gNB (steps 202 and 204) and provides a data forwarding address indication to the last serving gNB (step 206). The first gNB then requests that the serving AMF perform a path switch (steps 208 and 210). The first gNB then responds to the UE with an RRCRelease (step 212) that includes suspendConfig information. The first gNB then notifies the last serving gNB that is can discard that UE's context information (step 214).

Problems with Existing Solutions

There currently exist certain challenges. According to the current 3GPP standards, when a release includes redirect information that redirects the UE to a different RAT, the UE will transition to the RRC_IDLE state. In practice, a UE that receives redirect information goes to the RRC_IDLE state anyway. Thus, the conventional process shown in FIG. 2 is acceptable for RRCRelease without redirect but is not acceptable if the RRCRelease includes redirect information, because the UE will transition to the RRC_IDLE state and lose whatever security had been activated.

The question then was whether or not redirect information needed to be protected. In the RAN2 meeting RAN2 #AH 2018-07 in Montreal, the security aspects of the RRCRelease message containing redirection information were discussed for NR and RAN2 sent a Liaison Statement (LS) to the 3GPP Service and System Aspects (SA) Working Group 3-Security (SA3), requesting whether that message could be sent unprotected for performance reasons, as latency can be high and too much signaling can be generated when the UE comes from RRC_IDLE and needs to enter RRC_CONNECTED and establish AS security. The discussions were that redirection seemed sensitive information to be protected, later confirmed by SA3.

Thus, it has been decided that, due to security aspects of the RRCRelease message, the UE must have established AS security prior to receiving an RRCRelease message that includes redirection information. As a result, a process such as the RNA update process illustrated in FIG. 2 is unsuitable for receiving a release message that includes redirection information. Instead, a process such as the one shown in FIG. 3 must be used by conventional systems.

Conventional Release with Redirection to an NR Frequency UE in the RRC_IDLE State FIG. 3 illustrates a conventional process for release and redirect to an NR frequency for a UE currently in the RRC_IDLE state. At the RAN2 #103 meeting in Gothenburg, SA3 replied to the RAN2 LS on the security aspects of the RRCRelease message containing some of these information, stating that SA3 finds it necessary for RAN2 to ensure that RRC connection release message is at least integrity protected, and that this is required to enable the UE to validate the authenticity of the source of the message and prevent fake base station attack.

In other words, an RRCRelease message may only be processed by an RRC_CONNECTED UE and if it comes secured manner (i.e., at least integrity protected). Thus, in FIG. 3, the UE first transitions from the RRC_IDLE state to the RRC_CONNECTED state (steps 300 and 302), then transitions from the CM-IDLE state to the CM-CONNECTED state (steps 304 and 306), establishes NAS transport (steps 308, 310, 312, 314), and sets up a security context (steps 316, 318, and 320), before it can receive the RRCRelease message with redirection information (step 322).

In addition, according to the RRC specification (more precisely the field description of redirectedCarrierInfo) and the idle/inactive specification, the UE may only be redirected if it is leaving the RRC_CONNECTED state. It may be that the RRC specification was written with a specific use case in mind—namely, where a network node in a source RAT (e.g., NR) is getting overloaded and has either not implemented handovers/reconfiguration with sync or for some other reason prefers to redirect the RRC_CONNECTED UE to another frequency or RAT without having to configure measurements. This use case presumes that the UE is in the RRC_CONNECTED state.

However, another relevant use case is where the UE is in the RRC_IDLE state and wants to start a given service and, due to some network conditions (e.g., overloaded in a particular frequency and/or RAT, not supporting the requested service, like Voice over Internet Protocol (VoIP), etc.), the UE is moved to the RRC_CONNECTED state and then redirected with a Release message. This use case suffers a larger penalty in terms of latency and signaling by the SA3 requirement that message needs to be protected.

Moreover, there is a performance concern in terms of latency for incoming UEs trying to resume or setup a connection that want to access a particular service not supported in a target cell (e.g., VoIP, video call, etc.). As described above, in the case of an RRC_IDLE UE, the UE would need to trigger an RRC establishment procedure, enter RRC_CONNECTED, perform initial security activation, and only then receive the protected redirection information. That would also involve some core network signaling, as shown in FIG. 3.

Conventional Release with Redirection to an NR Frequency, UE in the RRC_INACTIVE State With the introduction of the RRC_INACTIVE state in NR, the procedure to enter the RRC_CONNECTED state from the RRC_INACTIVE is faster than the procedure to enter the RRC_CONNECTED state from the RRC_IDLE state. Hence, the use case of an incoming UE entering the RRC_CONNECTED state and then being released becomes faster as security is already activated, i.e., there is no need to perform the initial security activation procedure.

However, despite the benefits compared to the RRC_IDLE state, even for RRC_INACTIVE UEs there are still some significant amount of signaling and latency due to the fact that the UE first needs to enter the RRC_CONNECTED state before it can be redirected. Latency in release and redirect starting from the RRC_INACTIVE state can be shorter compared to the case where the UE comes from the RRC_IDLE state, since security is already activated. Upon sending a secure RRCRelease message the network may either move the UE to the RRC_IDLE state or the RRC_INACTIVE state. As the network redirects the UE to another NR frequency, in a typical case the network moves the UE to the RRC_INACTIVE state, to also speed up the resume of the connection in the target frequency, further reducing the overall latency, as shown in FIG. 4.

FIG. 4 illustrates a conventional process for release with redirection to an NR frequency for a UE currently in the RRC_INACTIVE state. In FIG. 4, the UE issues a RRCResumeRequest (step 400). The gNB retrieves the UE context from the last serving gNB (steps 402 and 404), and sends an RRCResume instruction to the UE (step 406). The UE then enters the RRC_CONNECTED state and issues a RRCResumeComplete message to the gNB (step 408). The gNB optionally provides a data forwarding address indication to the last serving gNB (step 410). The gNB then initiates a path switch at the AMF (steps 412 and 414), releases the UE context (step 416), and sends an RRCRelease to the UE (step 418). The RRCRelease instructs the UE to go to the RRC_INACTIVE state and to redirect to an NR frequency. The UE then goes to RRC_INACTIVE mode, then tries to resume in the indicated NR frequency (step 420).

As shown in FIG. 4, latency can be improved if an RRC_INACTIVE UE tries to resume an RRC connection and, after entering the RRC_CONNECTED state, the UE is suspended to the RRC_INACTIVE state with redirection information to an NR frequency. At the target cell, the UE tries to resume the connection. In this scenario, the delay can be calculated as:

2*RTT_nr(RRCResumeRequest,RRCResume,RR-CResumeComplete,RRCRelease)+RTT_Xn(network delay in source from context fetching)+RTT_5gc(signaling between CN and source path switch)+1.5*RTT_nr(RRCResumeRequest, RRCResume,RRCResumeComplete)+RTT_Xn (network delay in target from context fetching)+RTT_5gc(signaling between CN and source path switch)=3.5*RTT_nr+2*RTT_Xn+2*RTT_5gc.

Conventional Release with Redirection to an Evolved Universal Terrestrial Radio Access (E-UTRA) Frequency, UE in the RRC_INACTIVE State FIG. 5 illustrates a conventional process for release with redirection to an E-UTRA frequency for a UE currently in the RRC_INACTIVE state. In this inter-RAT case, if the service requested by the UE is not supported by NR, the network may redirect the UE to another RAT, for example LTE. Upon the reception of RRCRelease with redirection information, regardless if network indicates the UE to move to the RRC_INACTIVE state or the RRC_IDLE state, the UE shall perform actions upon entering the RRC_IDLE state and perform cell selection to an LTE cell in the indicated E-UTRA frequency and, perform an RRC Connection Setup procedure (transition from the RRC_IDLE state to the RRC_CONNECTED state in E-UTRA).

In FIG. 5, the UE issues a RRCResumeRequest (step 500). The gNB retrieves the UE context from the last serving gNB (steps 502 and 504), and sends an RRCResume instruction to the UE (step 506). The UE then enters the RRC_CONNECTED state and issues a RRCResumeComplete message to the gNB (step 508). The gNB optionally provides a data forwarding address indication to the last serving gNB (step 510). The gNB then initiates a path switch at the AMF (steps 512 and 514), releases the UE context (step 516), and sends an RRCRelease to the UE (step 518). The RRCRelease message may be with or without suspendConfig and redirects to an LTE frequency. The UE then goes to RRC_IDLE mode, performs a cell selection in the indicated LTE frequency and triggers RRC connection establishment (step 520).

As can be seen in the inter-RAT case shown in FIG. 5, latency can be improved if an RRC_INACTIVE UE tries to resume an RRC connection and, after entering the RRC_CONNECTED state, the UE is suspended to the RRC_INACTIVE state with redirection information to an E-UTRA frequency. At the target cell, the UE tries to establish the connection (using an RRC_IDLE to RRC_CONNECTED state transition). In this scenario, the delay can be calculated as:

2*RTT_nr(RRCResumeRequest,RRCResume,RR-CResumeComplete,RRCRelease)+RTT_Xn(network delay in source from context fetching)+RTT_5(signaling between CN and source path switch)+3.5*RTT_eutra(RRCConnectionRequest,RRCSetup,RRCSetupComplete,SecurityModeCommand,SecurityModeComplete)+2.5*RTT_EPC(signaling between CN and target eNB)=2*RTT_nr+2.5*RTT_eutra+RTT_5GC+2.5*RTT_EPC.

Problem of Existing Solution

According to the RRC specification, upon the reception of the RRCRelease message with the field redirectedCarrierInfo, the UE acts according to what is described in TS 38.304, which is the following: "On transition from the RRC_CONNECTED state to the RRC_IDLE state or RRC_INACTIVE state, the UE shall attempt to camp on a suitable cell according to redirectedCarrierInfo if included in the RRC message used for this transition."

In short, current 3GPP specifications require that, upon receiving an RRCResume message, the UE shall first enter the RRC_CONNECTED state before it can receive the redirectedCarrierInfo field and perform a release and redirect procedure. Because the UE will not have any data connection in the source cell/source RAT, there is significant signaling over the radio interface (to first enter the RRC_CONNECTED state via a full resume procedure), signaling between RAN network nodes (for context fetching), and signaling between RAN and CN nodes (for path switch). The subject matter of the present disclosure tries to address these problems.

SUMMARY

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure. Certain aspects of the present disclosure and their embodiments may provide solutions to the aforementioned or other challenges.

According to one aspect of the present disclosure, a method performed by a User Equipment (UE) for communicating within a telecommunications network comprises: while in a Radio Resource Control (RRC) INACTIVE state, sending, to a base station, a request to resume communication, and, without entering an RRC CONNECTED state, receiving, from the base station, an instruction to release and redirect; and, in response to receiving the instruction to release and redirect, performing cell selection in a Radio Access Technology (RAT), and attempting to establish or resume communication with a selected cell.

In some embodiments, the request to resume communication comprises an RRCResumeRequest message.

In some embodiments, the instruction to release and redirect comprises an RRCRelease message.

In some embodiments, the instruction to release and redirect identifies the RAT in which cell selection is to be performed.

In some embodiments, the RAT in which cell selection is to be performed comprises a New Radio (NR) frequency or a Long Term Evolution (LTE) frequency.

In some embodiments, attempting to establish or resume communication with the selected cell comprises attempting to establish communication with the selected cell.

In some embodiments, attempting to establish communication with the selected cell comprises performing an RRC establishment procedure.

In some embodiments, attempting to establish or resume communication with the selected cell comprises attempting to resume communication with the selected cell.

In some embodiments, attempting to resume communication with the selected cell comprises performing an RRC resume procedure.

According to another aspect of the present disclosure, a method performed by a base station for communicating with a UE within a telecommunications network comprises: receiving, from the UE in an RRC INACTIVE state, a request to resume communication; and, in response to receiving the request to resume communication, and without first sending to the UE an instruction to resume, sending, to the UE, an instruction to release and redirect.

In some embodiments, the request to resume communication comprises an RRCResumeRequest message.

In some embodiments, the instruction to release and redirect comprises an RRCRelease message.

In some embodiments, the instruction to release and redirect identifies a RAT in which cell selection is to be performed.

In some embodiments, the RAT in which cell selection is to be performed comprises a NR frequency or a LTE frequency.

In some embodiments, the method further comprises, prior to sending the instruction to release and redirect, performing a context relocation.

In some embodiments, performing the context relocation further comprises the steps of: retrieving, from a last serving base station, a context associated with the UE; sending, to an Access and Mobility Management Function (AMF), a path switch request; and receiving, from the AMF, a path switch request response.

In some embodiments, the method further comprises, after sending the instruction to release and redirect, sending, to the last serving base station, an instruction to release the context associated with the UE.

According to another aspect of the present disclosure, a wireless device for communicating within a telecommunications network comprises: processing circuitry configured to perform any of the UE methods disclosed herein; and power supply circuitry configured to supply power to the wireless device.

According to another aspect of the present disclosure, a base station for communicating with a UE within a telecommunications network comprises: processing circuitry configured to perform any of the base station methods disclosed herein; and power supply circuitry configured to supply power to the base station.

According to another aspect of the present disclosure, a UE for communicating within a telecommunications network comprises: an antenna configured to send and receive wireless signals; radio front-end circuitry connected to the antenna and to processing circuitry, and configured to condition signals communicated between the antenna and the processing circuitry; the processing circuitry being configured to perform any of the UE methods disclosed herein; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

According to another aspect of the present disclosure, a communication system including a host computer comprises: processing circuitry configured to provide user data; and a communication interface configured to forward the user data to a cellular network for transmission to a UE; wherein the cellular network comprises a base station having a radio interface and processing circuitry, the base station's processing circuitry is configured to perform any of the base station methods disclosed herein.

In some embodiments, the communication system further includes the base station.

In some embodiments, the UE is configured to communicate with the base station.

In some embodiments, the processing circuitry of the host computer is configured to execute a host application, thereby providing the user data; and the UE comprises processing circuitry configured to execute a client application associated with the host application.

According to another aspect of the present disclosure, a method implemented in a communication system including a host computer, a base station, and a UE comprises: at the host computer, providing user data; and at the host computer, initiating a transmission carrying the user data to the UE via a cellular network comprising the base station, wherein the base station performs any of the base station methods disclosed herein.

In some embodiments, the method further comprises, at the base station, transmitting the user data.

In some embodiments, the user data is provided at the host computer by executing a host application, the method further comprising, at the UE, executing a client application associated with the host application.

According to another aspect of the present disclosure, a UE configured to communicate with a base station comprises a radio interface and processing circuitry configured to perform any of the UE methods disclosed herein.

According to another aspect of the present disclosure, a communication system including a host computer comprises: processing circuitry configured to provide user data; and a communication interface configured to forward user data to a cellular network for transmission to a UE; wherein the UE comprises a radio interface and processing circuitry, the UE's components configured to perform any of the UE methods disclosed herein.

In some embodiments, the cellular network further includes a base station configured to communicate with the UE.

In some embodiments, the processing circuitry of the host computer is configured to execute a host application, thereby providing the user data; and the UE's processing circuitry is configured to execute a client application associated with the host application.

According to another aspect of the present disclosure, a method implemented in a communication system including a host computer, a base station, and a UE comprises: at the host computer, providing user data; and, at the host computer, initiating a transmission carrying the user data to the UE via a cellular network comprising the base station, wherein the UE performs any of the UE methods disclosed herein.

In some embodiments, the method further comprises at the UE, receiving the user data from the base station.

According to another aspect of the present disclosure, a communication system including a host computer comprises: a communication interface configured to receive user data originating from a transmission from a UE to a base station; wherein the UE comprises a radio interface and processing circuitry, the UE's processing circuitry configured to perform any of the UE methods disclosed herein.

In some embodiments, the communication system further includes the UE.

In some embodiments, the base station comprises a radio interface configured to communicate with the UE and a communication interface configured to forward to the host computer the user data carried by a transmission from the UE to the base station.

In some embodiments, the processing circuitry of the host computer is configured to execute a host application; and the UE's processing circuitry is configured to execute a client application associated with the host application, thereby providing the user data.

In some embodiments, the processing circuitry of the host computer is configured to execute a host application, thereby providing request data; and the UE's processing circuitry is configured to execute a client application associated with the host application, thereby providing the user data in response to the request data.

According to another aspect of the present disclosure, a method implemented in a communication system including a host computer, a base station, and a UE comprises: at the host computer, receiving user data transmitted to the base station from the UE, wherein the UE performs any of the UE methods disclosed herein.

In some embodiments, the method further comprises, at the UE, providing the user data to the base station.

In some embodiments, the method further comprises at the UE, executing a client application, thereby providing the user data to be transmitted; and at the host computer, executing a host application associated with the client application.

In some embodiments, the method further comprises at the UE, executing a client application; and at the UE, receiving input data to the client application, the input data being provided at the host computer by executing a host application associated with the client application; wherein the user data to be transmitted is provided by the client application in response to the input data.

According to another aspect of the present disclosure, a communication system includes a host computer comprising a communication interface configured to receive user data originating from a transmission from a UE to a base station, wherein the base station comprises a radio interface and processing circuitry, the base station's processing circuitry is configured to perform any of the base station methods disclosed herein.

In some embodiments, the communication further includes the base station.

In some embodiments, the UE is configured to communicate with the base station.

In some embodiments, the processing circuitry of the host computer is configured to execute a host application; and the UE is configured to execute a client application associated with the host application, thereby providing the user data to be received by the host computer.

According to another aspect of the present disclosure, a method implemented in a communication system including a host computer, a base station, and a UE comprises: at the host computer, receiving, from the base station, user data originating from a transmission which the base station has received from the UE, wherein the UE performs any of the UE methods disclosed herein.

In some embodiments, the method further comprises at the base station, receiving the user data from the UE.

In some embodiments, the method further comprises at the base station, initiating a transmission of the received user data to the host computer.

Thus, the systems and methods disclosed herein include redirecting a UE in the RRC_INACTIVE state to different frequency/RAT using a two-step release with redirect procedure, i.e., a release with redirect message is sent in direct response to a resume request.

There are, proposed herein, various embodiments which address one or more of the issues disclosed herein. Certain embodiments may provide one or more of the following technical advantages. One advantage of the proposed method is the reduced latency and signaling in the air interfaces and inter-node interfaces (both between RAN nodes and between RAN and CN).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 illustrates a conventional interaction between upper layers/Non-Access Stratum (NAS) and Access Stratum (AS);

FIG. 10 illustrates an exemplary two-step process for release and redirect according to some embodiments of the present disclosure;

FIG. 11 illustrates an exemplary interaction between exemplary NAS and AS layers according to some embodiments of the present disclosure;

FIG. 12 illustrates an exemplary interaction between exemplary NAS and AS layers according to some embodiments of the present disclosure;

FIG. 25 is a flowchart illustrating a method implemented in a communication system, in accordance with some embodiments of the present disclosure; and FIG. 26 is a flowchart illustrating a method implemented in a communication system, in accordance with some embodiments of the present disclosure.

DETAILED DESCRIPTION

Figure 1:
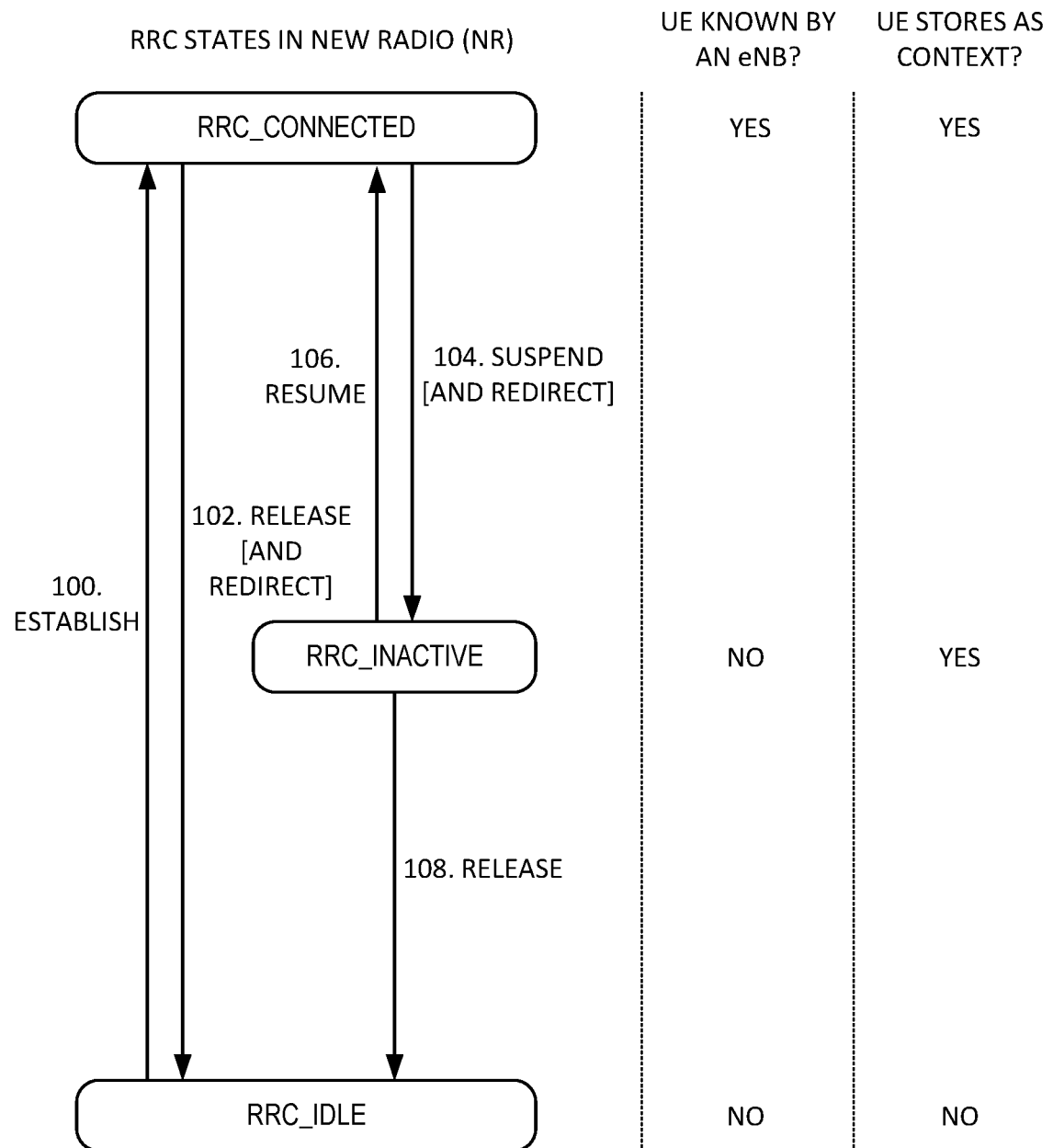
FIG. 1 illustrates a User Equipment (UE) state machine and possible state transitions between the Radio Resource Control (RRC) states in New Radio (NR)
Figure 2:
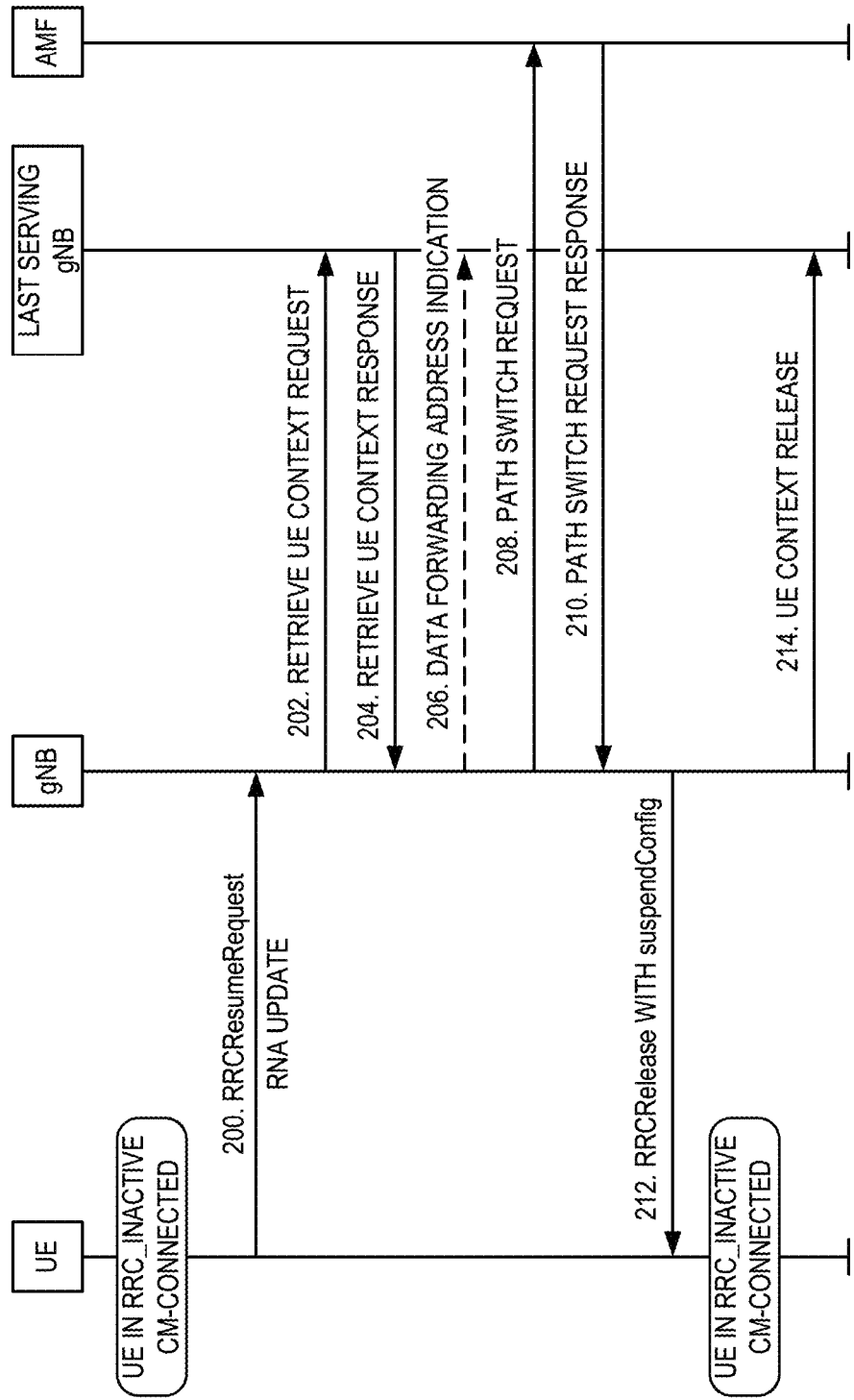
FIG. 2 illustrates a conventional Radio Network Subsystem Application Part User Adaption (RNA) Update procedure.
Figure 3:
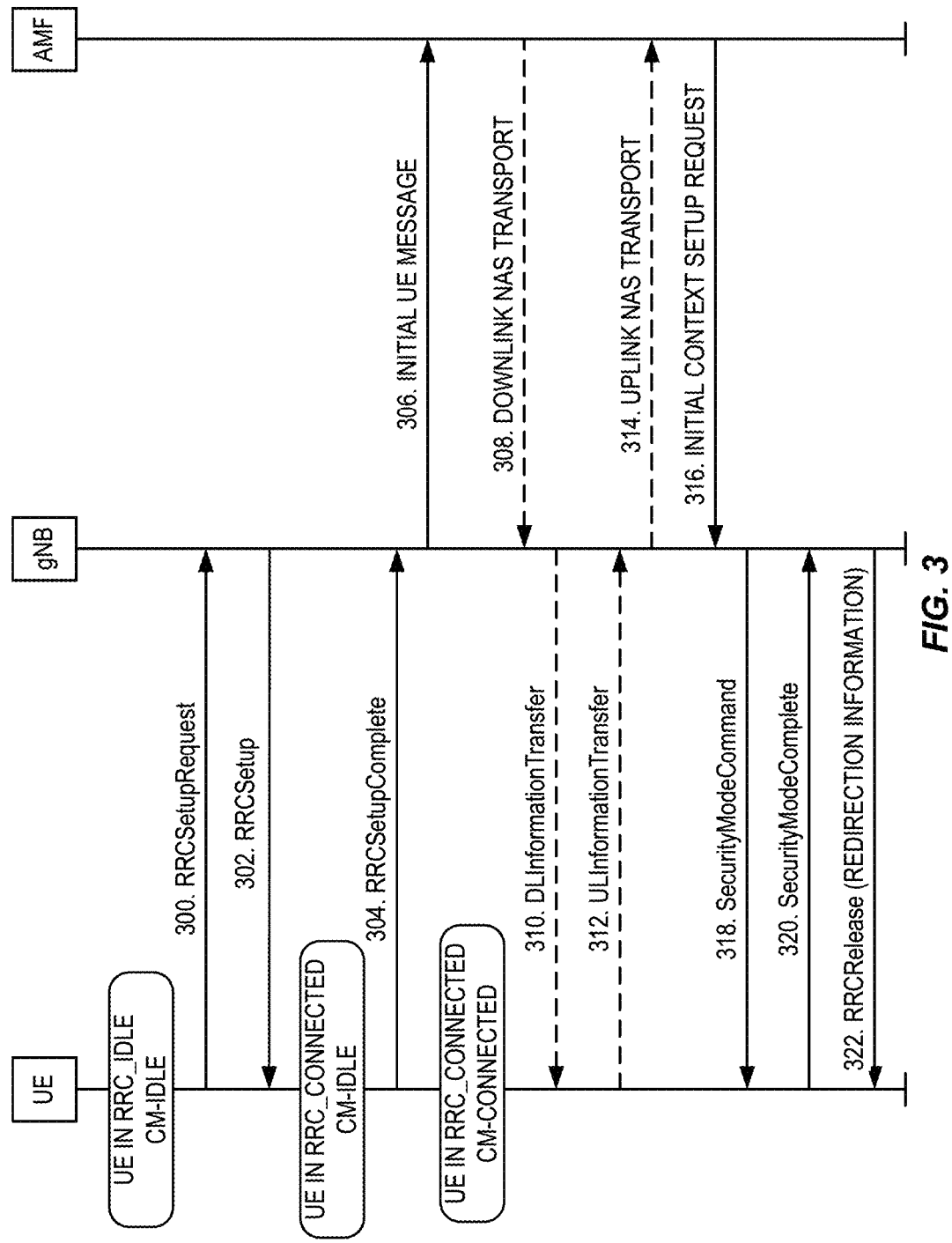
FIG. 3 illustrates a conventional process for release and redirect to an NR frequency for a UE currently in the RRC_IDLE state.
Figure 4:
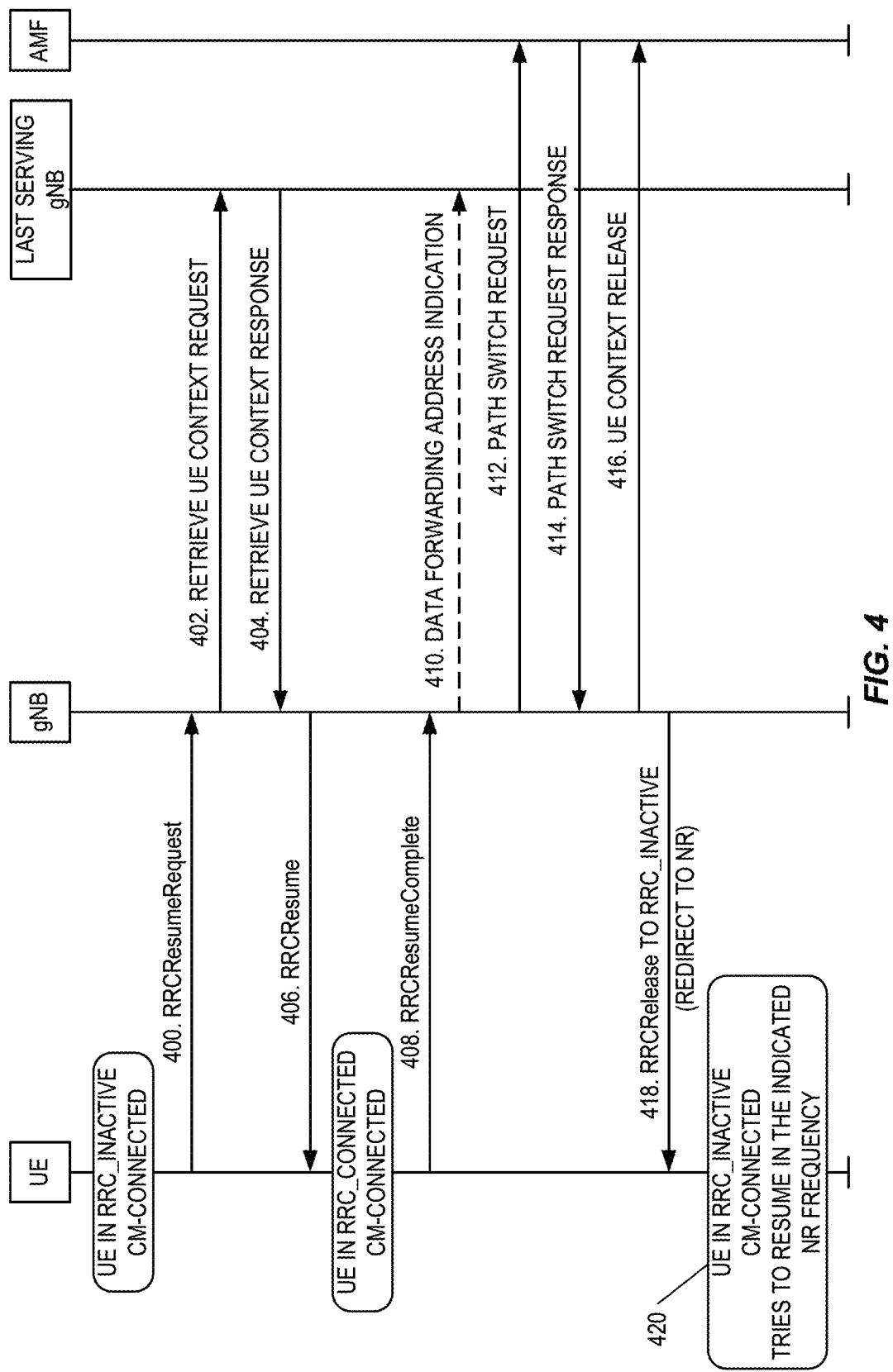
FIG. 4 illustrates a conventional process for release with redirection to an NR frequency for a UE currently in the RRC_INACTIVE state.
Figure 5:
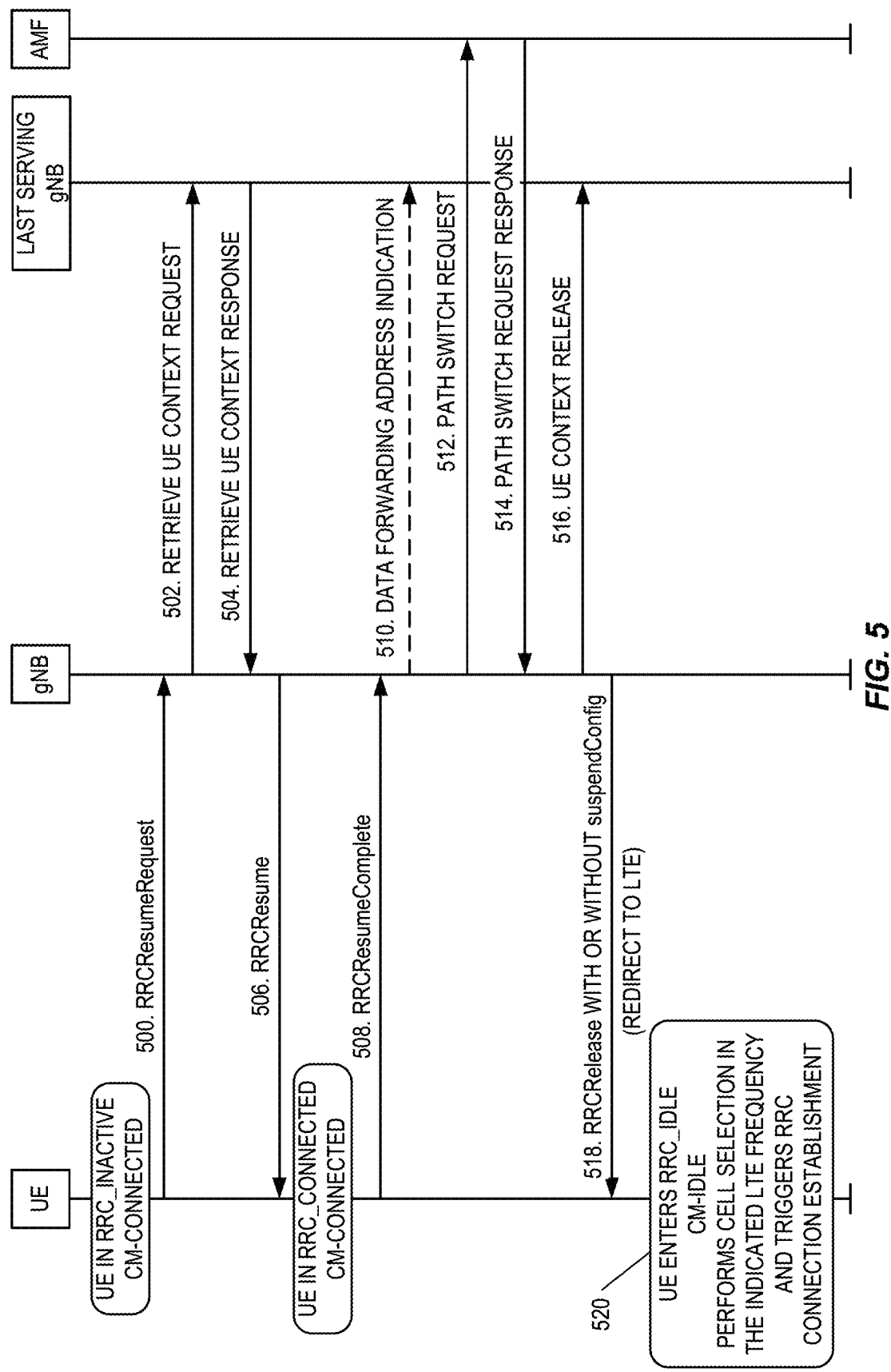
FIG. 5 illustrates a conventional process for release with redirection to an E-UTRA frequency for a UE currently in the RRC_INACTIVE state.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Improved Release with Redirection—UE

Figure 6:
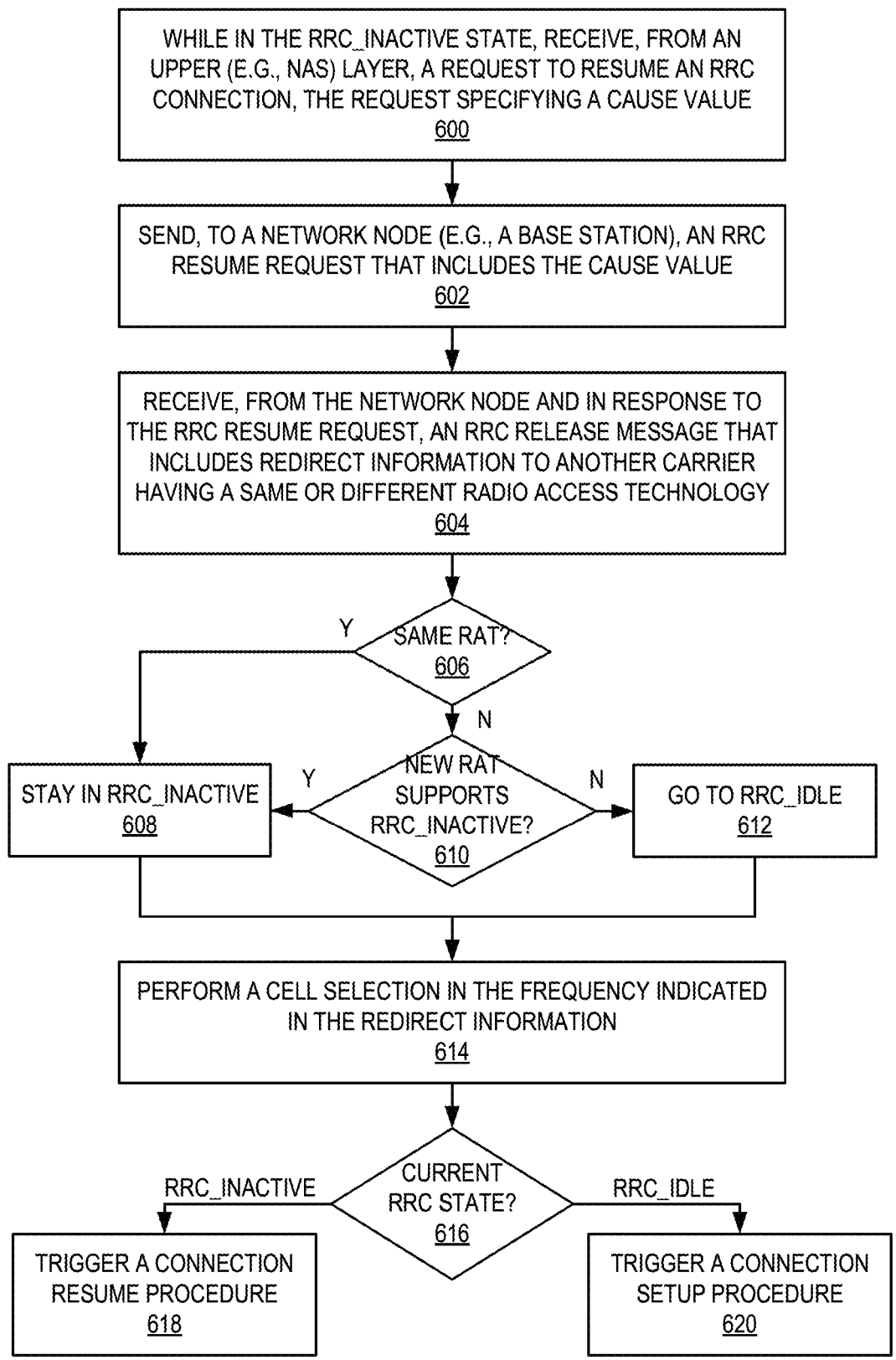
FIG. 6 illustrates an exemplary process for release and redirect, performed by a UE, according to some embodiments of the present disclosure.

FIG. 6 illustrates an exemplary process for release and redirect, performed by a UE, according to some embodiments of the present disclosure. In the embodiment illustrated in FIG. 6, a method executed by a UE in Radio Resource Control (RRC) inactive (RRC_INACTIVE) state comprises the following steps:

Step 600: receive from upper layers (e.g., the Non-Access Stratum (NAS) layer) a request to resume an RRC connection (e.g., a request to start a given service with an associated cause value, such as: emergency; highPriorityAccess; Mobile Terminated (MT) cause values, such as MT-Access; Mobile Originated (MO) cause values, such as MO-Data, MO-VoiceCall, MO-VideoCall, and MO-SMS; Multimedia Priority Service (MPS) cause values, such as MPS-PriorityAccess; Mission Critical Support (MCS) cause values, such as MCS-PriorityAccess, or any other cause value introduced in the future). These services may be supported by all nodes or may be supported by some nodes but not others.

Upon receiving the request from upper layers, the UE may perform actions upon transmitting an RRC Resume Request like message with a cause value that is associated with the request from upper layers.

Although step 600 is described above as a request from upper layers, the method is also applicable for a request from AS or RRC layers, e.g., in the case of an RNA update that is responded with a message suspending the UE back to the RRC_INACTIVE state (or equivalent) and redirecting the UE to another frequency in the same Radio Access Technology (RAT) or another frequency in a different RAT.

Step 602: transmit, to a network node (e.g., an eNB), an RRC Resume Requestmessage with a cause value that is associated with the request from upper layers. Conventional networks may only respond with an RRC Resume Request kind of message, such as an RRCResumeRequestmessage or an RRCResumeRequest1 (or an RRCConnectionResumeRequest in LTE), or with an RRCRelease (or RRCConnectionRelease in LTE) message in the case the RRC Resume Request is associated to Radio Network Subsystem Application Part User Adaption (RNA) updates, e.g., when they have a cause value Movement Authority (MA) Update.

Step 604: receive, from the network node and in response to the message in Step 602, an RRC Release message with redirect information to another carrier, which can either be from the same RAT or from a different RAT. There are several scenarios involving variations in the redirection target (e.g., NR versus LTE) and whether or not the RRC Release message includes a suspend configuration:

NR Inactive to NR Inactive. In some embodiments, if the RRC_INACTIVE UE tried to resume in NR and receives a redirection information to an NR frequency, and the message contains a suspend configuration, the UE remains in RRC_INACTIVE state and performs cell selection upon entering RRC_INACTIVE in the carrier frequency indicated in the message.

NR Inactive to NR Idle. In some embodiments, if the RRC_INACTIVE UE tried to resume in NR and receives a redirection information to an NR frequency, and the message does not contain a suspend configuration, the UE enters RRC_IDLE state (and performs actions accordingly, e.g., stop timers, release resources, etc.) and performs cell selection upon entering RRC_IDLE in the carrier frequency indicated in the message.

The same principles could be applied to an "LTE to LTE" procedure.

NR Inactive to LTE Inactive. In some embodiments, if the RRC_INACTIVE UE tried to resume in NR and receives a redirection information to an LTE frequency, and the message contains a suspend configuration, the UE remains in RRC_INACTIVE state and performs inter-RAT cell selection upon entering RRC_INACTIVE in the carrier frequency indicated in the message. That is executed by UEs supporting RRC_INACTIVE in the target RAT, in this example, LTE. If the UE does not support RRC_INACTIVE in LTE, the UE enters RRC_IDLE upon receiving the RRCRelease with redirect information regardless if the message contains a suspend configuration or not and performs inter-RAT cell selection upon entering RRC_IDLE in the carrier frequency indicated in the message.

NR Inactive to LTE Idle. In some embodiments, if the RRC_INACTIVE UE tried to resume in NR and receives a redirection information to an LTE frequency, and the message does not contain a suspend configuration, the UE enters RRC_IDLE state (and perform actions accordingly, e.g., stop timers, release resources, etc.) and perform cell selection upon entering RRC_IDLE in the carrier frequency indicated in the message.

The same principles could be applied to an "LTE to NR" procedure.

In any of these cases (LTE to NR, NR to NR, LTE to LTE or NR to LTE), the UE needs to perform cell selection.

The different scenarios described above are handled by steps 606, 608, 610, 612, and 614 of FIG. 6. In the embodiment illustrated in FIG. 6, the UE determines whether the redirect information is towards the same RAT (step 606), and if so, the UE will remain in the RRC_INACTIVE state (step 608). If the redirect information is towards a different RAT, however, the UE will determine whether the new RAT supports the RRC_INACTIVE state (step 610), and if so, will remain in that state (step 608) or else will go to the RRC_IDLE state (step 612). After that, the UE performs the following steps.

Step 614: perform cell selection upon entering the RRC_INACTIVE state or the RRC_IDLE state, in the frequency indicated in the RRC Release message (in the redirection information).

Upon doing cell selection, the UE may enter a new RNA, i.e., a cell, tracking area, registration area, RAN area ID, etc. for which the UE is not configured. Rather than performing a RAN area update, the UE tries to resume in the newly selected cell according to the resume cause that first generated the RRC Resume Request message that was requested by upper layer and that was responded to with the RRC release with redirect information. In more general terms, in some embodiments the upper layer request and the resume procedure are considered pending and should be initiated after cell selection. They should take precedent of any RRC or AS procedure triggered upon cell selection like entering a new RAN area that is not configured as part of the RNA configuration for that UE.

Upon doing cell selection, the UE may enter a new Tracking Area (or Registration Area) that is not configured with (e.g., not part of its configured area list). In these scenarios, in some embodiments, instead of performing a Tracking Area Update (or equivalent, like a Registration Area Update), the method includes trying to resume in the newly selected cell according to the resume cause that first generated the RRC Resume Request message requested by upper layer and that was responded to with the RRC release with redirect information. In some embodiments, the upper layer request and the resume procedure are considered pending and should be initiated after cell selection. They should take precedent of any RRC procedure, AS procedure or even a NAS procedure (in the case of a registration area update) triggered upon cell selection.

Upon doing cell selection, the UE may enter a new Tracking Area (or Registration Area) that is not configured with (e.g., not part of its configured area list). The method comprises, instead of performing a Tracking Area Update (or equivalent, like a Registration Area Update), trying to resume in the newly selected cell according to the resume cause that first generated the RRC Resume Request message requested by upper layer and that was responded with the RRC release with redirect information. In more general terms, the upper layer request and the resume procedure is somehow considered pending and should be initiated after cell selection. They should take precedent of any RRC procedure, AS procedure but not a NAS procedure related to a registration area update triggered upon cell selection. The reason could be due to the fact a given service is not supported before an area update is performed.

In some embodiments, the UE performs cell selection even though it is not leaving RRC_CONNECTED state. Hence, this is a new trigger for cell selection: UE is entering the RRC_INACTIVE state or the RRC_IDLE state upon the reception of an RRC Release message (either to RRC_IDLE state or RRC_INACTIVE state) when the UE is coming from the RRC_INACTIVE state.

In cell selection upon entering the RRC_INACTIVE state or entering the RRC_IDLE state, the UE shall attempt to camp on a suitable cell according to redirectedCarrierInfo if included in the RRC message used for this transition. If the UE cannot find a suitable cell, the UE is allowed to camp on any suitable cell of the indicated RAT. If no suitable cell is found according to the above, the UE shall perform cell selection using stored information in order to find a suitable cell to camp on.

Step 616: determine the UE's current RRC state, e.g., RRC_IDLE or RRC_INACTIVE.

Step 618: if the UE is in the RRC_INACTIVE state, trigger a connection resume procedure in the indicated RAT or other procedure in the indicated RAT based on redirection information.

Step 620: if the UE is in the RRC_IDLE state, trigger a connection setup procedure in the indicated RAT or other procedure in the indicated RAT based on redirection information.

Improved Release with Redirection—Network Node

Figure 7:
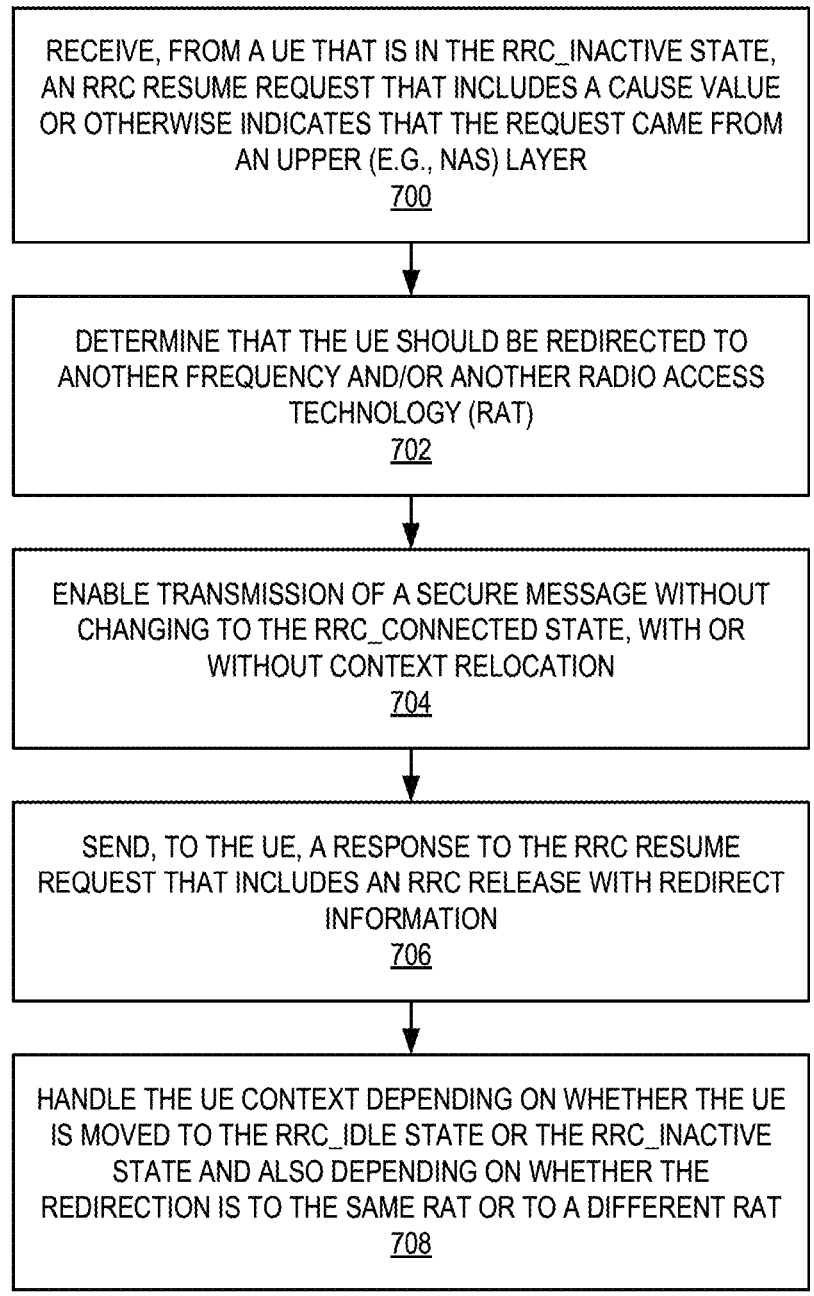
FIG. 7 illustrates an exemplary process for release and redirect, performed by a network node, according to some embodiments of the present disclosure.

FIG. 7 illustrates an exemplary process for release and redirect, performed by a network node, according to some embodiments of the present disclosure. In the embodiment illustrated in FIG. 7, a method executed by a network node comprises the following steps:

Step 700: receive, from a UE that is in the RRC_INACTIVE state, an RRCResumeRequestmessage that includes a cause value or otherwise indicates that this was requested by upper layers. In this step the target gNB (or eNB or any sort of RAN node) serving the cell which the UE tries to resume in receives an RRC resume request like message from the UE. The cause value associated to that resume request indicates that the request was triggered by upper layers in the UE (e.g., NAS). Examples of these include, but are not limited to: emergency, highPriorityAccess, MT-Access, MO-Data, MO-VoiceCall, MO-VideoCall, MO-SMS, MPS-PriorityAccess, or MCS-PriorityAccess.

Due to some network condition or local policy (e.g., target cell/carrier/RAT overloaded or service associated with cause value not available in target cell/carrier/RAT), the target gNB may decide to redirect to another frequency or RAT. Alternatively, if the AS context is not relocated and it is the source gNB that generates the RRC release message, it may be the source gNB (or eNB or any sort of RAN node) that decides to redirect the UE. However, this may require, for example, that the cause value or some other information indicative of the request service is forwarded to source gNB by the target gNB.

Step 702: determine that the UE should be redirected to another frequency and/or another RAT.

Step 704: upon determining that the UE should be redirected to another frequency or to another RAT, enable the transmission of a secure message without moving the UE to the RRC_CONNECTED state. This may be done with or without context relocation.

In the first alternative the target gNB fetches the AS context from the source gNB (sometimes called anchor gNB) over the Xn interface. As part of the context fetch procedure the source gNB also validates the identity of the UE issuing the request (by verifying the shortResume-MAC-I contained in the resume request like message). The AS context contains, among other things, the security parameters (e.g., security key and security algorithms) required for re-activating AS security so that the RRC release message can be sent protected (so SA3 security requirements for 5G are fulfilled). The target gNB also performs a path switch procedure with the AMF to inform the CN of the UE's new location and to update the control- and user plane paths. As part of this procedure the target gNB also receives a fresh {NCC, NH} pair from the AMF. The NCC value from this pair is included in the inactive configuration (suspendConfig) in the RRC release message sent in the next step. As an optimization, to further reduce the latency of the re-direct, the target gNB may choose to perform the path switch procedure in parallel to or after sending the release message (i.e., step 3 below). However, as the NCC value in the path switch acknowledgement is normally included in the release message, this requires that the target gNB can predict/determine the NCC received in the path switch acknowledgement ahead of time. This is possible since the next NCC is typically the previous NCC value (which can be stored as part of the AS context) incremented with one.

In the second alternative the target gNB still contacts the source gNB to validate the request but it does not fetch the AS context. Since the AS context is not relocated, the target gNB will not be able to re-activate AS security, and hence it is the source gNB that must secure (i.e., integrity protect and cipher) the release message. This implies that all information required to build the release message must either already be known to the source gNB or forwarded to the source gNB by the target gNB. Thus, if the target gNB makes the decision to redirect the UE, it needs to send the redirection information (e.g., target frequency and target RAT) to the source gNB so that the source gNB can include the redirection information in the release message. Notice that since the AS context is not relocated, the target gNB does not perform the path switch.

In the prior art, RAN area update (in particular periodic RAN area updates) have been mentioned as the procedure to use the resume without context relocation. The subject matter of the present disclosure introduces a new use case where the target node, knowing that this will be a release and redirect procedure, triggers the procedure without relocation. The target node may inform the source node of the reason being release and redirect so that source does not have to bother with some of the suspend configuration parameters such as the ones related to RNA updates. There may be an indication in the message from target to source saying this is a release and redirect procedure, without context relocation.

Step 706: send, to the UE, a response to the RRCResumeRequestmessage, the response including an RRC Release with redirect information. In this step, if the AS context was relocated in the previous step, the target gNB generates and secures the release message redirect information and sends it to the UE. The release message includes information about the redirected carrier (redirectedCarrierInfo) and, if the network wants the UE to remain in RRC_INACTIVE state, the inactive configuration (suspendConfig). If the AS context is not relocated, the release message is constructed and secured by the source gNB and is sent to the target gNB which in turn forwards it transparently to the UE. As the release message is sent in response to the resume request, the UE does not transition to RRC_CONNECTED; instead it remains in RRC_INACTIVE state, if the suspend configuration is included in the release message, or transitions to RRC_IDLE, otherwise.

Step 708: handle the UE context depending whether the UE is moved to the RRC_IDLE state or the RRC_INACTIVE state and whether the redirection information is inter-RAT or intra-RAT. Since RRC_INACTIVE is not supported across RATs in Rel-15, the UE will automatically transition to RRC_IDLE if it is redirected from NR to LTE (or vice versa) regardless if the release message contains the inactive configuration or not. Thus, if the network redirects the UE from NR to LTE (or vice versa), it can delete the AS context after it has sent the release message. Depending if the AS context is relocated not, it is either the source or target gNB that deletes the AS context.

Figure 8:
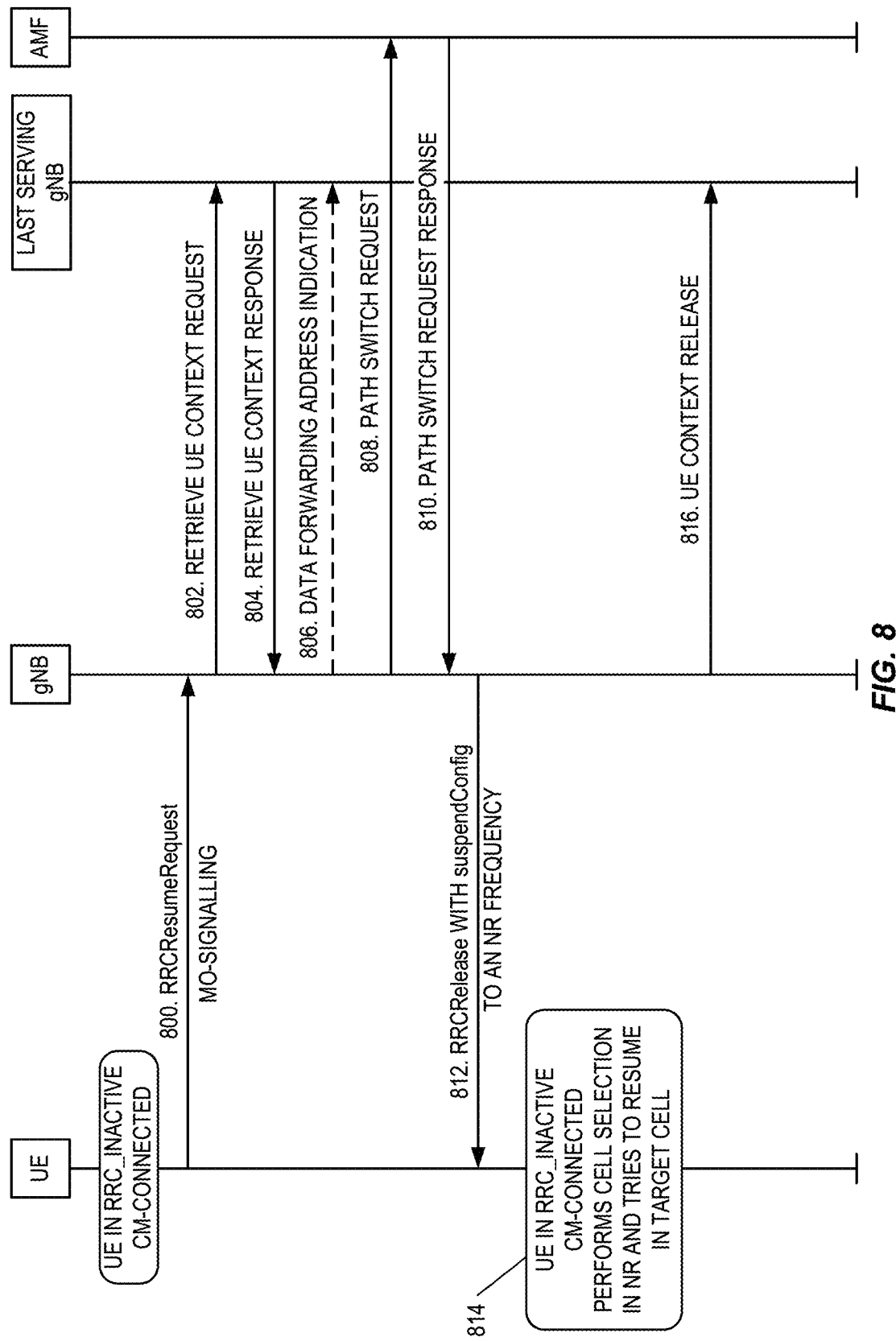
FIG. 8 illustrates an exemplary two-step process for release and redirect according to some embodiments of the present disclosure.

Release with Redirection to an NR Frequency, UE in the RRC_INACTIVE State, in 2 Steps One method of the proposed solution with context relocation and without context relocation, where the exact latency reductions are different, is shown in FIG. 8.

FIG. 8 illustrates an exemplary two-step process for release and redirect according to some embodiments of the present disclosure. In this scenario, with context relocation, the call flow illustrated in FIG. 8 could apply to redirection to a NR frequency. In the embodiment illustrated in FIG. 8, the following steps are performed:

Step 800: a UE in an RRC_INACTIVE, CM-CONNECTED state issues an RRCResumeRequest message to a first gNB.

Step 802 and 804: the first gNB retreives the UE context from the last serving gNB.

Step 806: the first gNB provides the last serving gNB with a data forwarding address indication.

Step 808 and 810: the first gNB then requests that the serving AMF perform a path switch.

Step 812: the first gNB then responds to the UE with an RRCRelease message that includes suspendConfig information and that also redirects the UE to another NR frequency.

In contrast to the prior art methods, in which the gNB would issue an RRCResume message before issuing the RRCRelease message, in the embodiment illustrated in FIG. 8, the gNB does not first issue an RRCResume message. Consequently, the UE does not enter the RRC_CONNECTED state.

Step 814: the UE then performs cell selection in NR and tries to resume in the target cell.

Step 816: the gNB issues a UE Context Release message to the last serving gNB.

Since, from the UE's point of view, the process involved just two steps—sending the RRCResumeRequest (step 800) and receiving the RRCRelease with redirect (step 812)—this method is referred to herein as a "two-step" process. In the two-step release and redirect with context relocation as illustrated in FIG. 8, an RRC_INACTIVE UE tries to resume an RRC connection and without entering the RRC_CONNECTED state, the UE is suspended to the RRC_INACTIVE state with redirection information to an NR frequency. At the target cell, the UE tries to resume the connection. Compared to the conventional case where the UE first enters the RRC_CONNECTED state to then be released, two messages between UE and the target can be skipped (RRCResume and RRCResumeComplete). In this scenario, the delay can be calculated as:

$$RTT\_nr(RRCResumeRequest, RRCRelease) + RTT\_Xn \\ (\text{network delay in source from context fetching}) + RTT\_5gc(\text{signaling between CN and source path switch}) + 1.5*RTT\_nr(RRCResumeRequest, RRCResume, RRCResumeComplete) + \\ RTT\_Xn(\text{network delay in target from context fetching}) + RTT\_5gc(\text{signaling between CN and source path switch}) = 2.5*RTT\_nr + 3*RTT\_Xn + 2*RTT\_5gc.$$

In some embodiments, the process illustrated in FIG. 8 is even further optimized in the case where the UE performs a two-step procedure without context relocation. In these embodiments, upon sending an RRCResumeRequest (that is not an RNA update) the UE receives an RRCRelease with suspendConfig but the network does not perform context relocation—e.g., steps 808 and 810 are not performed. Since the network knows that in the release and redirection case the UE is anyway going to another frequency and resuming in another cell which may be in another gNB, it might not make sense to trigger context fetching since that new target may trigger context fetching again. Hence, a two-step procedure (RRCResumeRequest followed by an RRCRelase with suspendConfig and redirection information) without context relocation can even further reduce the latency of the procedure, due to the fact that path switch does not need to be performed (as the anchor gNB/eNB hold the connection with the CN would not need to change). In this scenario, the delay can be calculated as:

$$RTT\_nr(RRCResumeRequest, RRCRelease) + \\ 1.5*RTT\_Xn(\text{network delay in target from context fetching}) + 1.5*RTT\_nr(RRCResumeRequest, RRCResume, RRCResumeComplete) + \\ 1.5*RTT\_Xn(\text{network delay in target from context fetching}) + RTT\_5gc(\text{signaling between CN and source path switch}) = 2.5*RTT\_nr + 3*RTT\_Xn + RTT\_5gc.$$

For the inter-frequency release and redirect, the latency in different scenarios can be summarized in the following table:

| Procedure | Conventional 3-step procedure with context relocation in inactive state | two-step procedure with context relocation | two-step procedure without context relocation |
|---|---|---|---|
| Delay | 3.5 * RTT_nr + 3.0 * RTT_Xn + 2.0 * RTT_5gc | 2.5 * RTT_nr + 3.0 * RTT_Xn + 2.0 * RTT_5gc | 2.5 * RTT nr + 3.0 * RTT_Xn + 1.0 * RTT_5gc |
| Delay Reduction | | 1.0 * RTT_nr | 1.0 * RTT_nr + 1.0 * RTT_5gc |

In some embodiments, the two-step procedure with context relocation is optimized to achieve the same latency as the two-step procedure without context relocation. In this optimization, the context is still fetched and the path switch is still performed but the release with redirect message is sent before the path switch instead of after. Referring to FIG. 8, in these embodiments, step 812 would occur earlier in the process, e.g., prior to step 810, 808, 806, 804, or 802. In this way, since the UE can start to resume with the target cell immediately after receiving the release with redirect message is received, the path switch procedure does not add to the delay experienced by the UE. This optimization is possible since the release message can be prepared by the gNB before the path switch response is received.

Release with Redirection to an LTE Frequency, UE in the RRC_INACTIVE State, in 2 Steps The call flow for this case is similar to the previous case except that the UE is redirected an LTE carrier instead of an NR carrier. Similar latency gains compared to conventional can be achieved also in this case although the detailed signaling differs.

Other Applications

The present disclosure describes the method as actions performed by an RRC_INACTIVE UE in NR. While the subject matter of the present disclosure is applicable for that case, there can be other additional cases the subject matter of the present disclosure is equally applicable such as:
   All previous cases where procedures occur in LTE instead of NR; that is, for the case of LTE RRC_INACTIVE UEs (when UE is connected to 5GC and that is supported by the LTE cell);
   Inter-RAT procedures in the RRC_INACTIVE state, mainly between LTE and NR connected to the same CN (5G Core Network):
      A UE in the LTE RRC_INACTIVE state tries to resume and is suspended to the NR RRC_INACTIVE state with release and redirect in two steps, and then tries to resume in NR according to redirection information;
      A UE in the NR RRC_INACTIVE state tries to resume and is suspended to the LTE RRC_INACTIVE state with release and redirect in two steps, and then tries to resume in LTE according to redirection information;
   Inter-RAT procedures in the RRC_INACTIVE state or the RRC_IDLE state, e.g., between LTE and NR, even when the RRC_INACTIVE state is not supported by LTE (e.g., in the case LTE is connected to EPC) or NR (in the case a given network, frequency or part of the network does not support inactive state):
      A UE in the LTE RRC_INACTIVE state tries to resume and is suspended to the NR RRC_INACTIVE state with release and redirect in two-steps, and then enters the RRC_IDLE state and tries to setup the connection in NR according to redirection information;
      A UE in the NR RRC_INACTIVE state tries to resume and is suspended to the LTE RRC_INACTIVE state with release and redirect in two-steps, and then enters the RRC_IDLE state and tries to setup the connection in LTE according to redirection information;

Notice that in the description for the inter-RAT case, there is defined a harmonized suspend/resume procedure for the RRC_INACTIVE mobility, i.e., the UE can be suspended in one RAT and resume in the other RAT.

For the method described in the network side, that can be any RAN node possibly having an associated cell to it or more fundamentally where the UE may camp and perform a resume request procedure. That network node can be a gNB in the case of an NR cell or LTE cell connected to 5GC. That network node can be a gNB in the case of an NR cell. That network node can be an evolved or enhanced Node B (eNB) in the case of an LTE cell (e.g., connected to EPC).

For the method described in the network side, the term Xn interface has been used to refer to the Xn interface between gNB(s) in the NR case/5GC. However, the method applies for any inter-node interface between RAN nodes where the AS context can be fetched/relocated, e.g., X2 interface between eNB(s) in LTE. In these cases, messages are using an application layer protocol like XnAP or X2AP.

Interaction Between Access Stratum (AS) and Non Access Stratum (NAS) Layers

Another novel aspect of the subject matter presented herein is the interaction between AS and NAS layers. In the prior art case, the upper layers are informed when a connection that was suspended is resumed, i.e., when the UE enters RRC_CONNECTED. By doing that, upper layers are aware that the bearers have been successfully resumed. Otherwise, the upper layers are notified that a failure has occurred, and, in that case, the upper layers may trigger a NAS recovery procedure (e.g., Tracking Area Update or Registration Area Update). In the case of a transition from RRC_IDLE to RRC_CONNECTED, that sort of acknowledgement to upper layers is provided upon the setup of bearers, done during the radio resource configuration.

As part of the method the upper layers are notified that the UE is being suspended after a request to resume the connection. Looking at the RRC specifications, this currently looks like that today:

Begin Excerpt from RRC Specifications 5.3.13.4 Reception of the RRCResume by the UE The UE shall:
   stop timer T319;
   if the RRCResume includes the fullConfig:

```
    perform the full configuration procedure as specified in 5.3.5.11;
else:
    restore the PDCP state and reset COUNT value for SRB2 and all DRBs;
    restore the cellGroupConfig from the stored UE AS context;
    indicate to lower layers that stored UE AS context is used;
discard the fullI-RNTI, shortI-RNTI and the stored UE AS context, except ran-
NotificationAreaInfo;
if the RRCResume includes the masterCellGroup:
    perform the cell group configuration for the received masterCellGroup according to
5.3.5.5;
Editor's Note: FFS Whether it is supported to configure secondaryCellGroup at Resume.
    if the RRCResume includes the radioBearerConfig:
        perform the radio bearer configuration according to 5.3.5.6;
Editor's Note: FFS Whether there needs to be a second radioBearerConfig.
    resume SRB2 and all DRBs;
    if stored, discard the cell reselection priority information provided by the cellReselectionPriorities
    or inherited from another RAT;
    stop timer T320, if running;
    if the RRCResume message includes the measConfig:
        perform the measurement configuration procedure as specified in 5.5.2;
    resume measurements if suspended;
Editor's Note: FFS Whether there is a need to define UE actions related to access control timers
(equivalent to T302, T303, T305, T306, T308 in LTE). For example, informing upper layers if a given
timer is not running.
    enter RRC_CONNECTED;
    indicate to upper layers that the suspended RRC connection has been resumed;
    stop the cell re-selection procedure;
    consider the current cell to be the PCell;
    set the content of the of RRCResumeComplete message as follows:
        if the upper layer provides NAS PDU, set the dedicatedNAS-Message to include the
        information received from upper layers;
        if the upper layer provides a PLMN, set the selectedPLMN-Identity to PLMN selected by
        upper layers (TS 24.501 [23]) from the PLMN(s) included in the plmn-IdentityList in
        SIB1;
        if the masterCellGroup contains the reportUplinkTxDirectCurrent:
            include the uplinkTxDirectCurrentList;
    submit the RRCResumeComplete message to lower layers for transmission;
    the procedure ends.
```

End Excerpt from RRC Specifications

FIG. 9 illustrates a conventional interaction between upper layers/NAS and AS. In the embodiment illustrated in FIG. 9, the following steps occur within a UE:

Step 900: the upper layers/NAS (hereinafter referred to simply as "the NAS") request that a suspended connection be resumed.

Step 902: An RRCResumeRequest message is sent to the network by the AS.

Step 904: An RRCResume message is received from the network by the AS.

Step 906: The upper layers are notified and consider the procedure successful, e.g., that the suspended connection has been resumed. The UE enters the RRC_CONNECTED state. Thus, FIG. 9 illustrates the scenario where a UE goes from the RRC_INACTIVE state to the RRC_CONNECTED state.

The NAS specification (TS 24.501) also covers the case where the UE in state RRC_CONNECTED (or 5GMM-CONNECTED in the case of 5GC UE) receives an RRCRelease message to transit to the RRC_INACTIVE state, e.g., GMM-CONNECTED with inactive indication, as can be seen below from TS 38.331 and TS 24.501:

Begin Excerpts from NAS Specifications 5.3.8.3 Reception of the RRCRelease by the UE

```
The UE shall:
    delay the following actions defined in this sub-clause 60ms from the moment the
    RRCRelease message was received or optionally when lower layers indicate that the
    receipt of the RRCRelease message has been successfully acknowledged, whichever is
    earlier;
    stop timer T320, if running;
    if the RRCRelease message includes redirectedCarrierInfo indicating redirection to eutra:
        if cnType is included:
            the received cnType is provided to upper layers;
NOTE:Handling the case if the E-UTRA cell selected after the redirection does not support the
core network type specified by the cnType, is up to UE implementation.
        if the RRCRelease message includes the cellReselectionPriorities:
            store the cell reselection priority information provided by the
            cellReselectionPriorities;
            if the t320 is included:
                start timer T320, with the timer value set according to the value of t320;
            else:
                apply the cell reselection priority information broadcast in the system information;
            if deprioritisationReq is included:
```

```
    start or restart timer T325 with the timer value set to the deprioritisationTimer
    signalled;
    store the deprioritisationReq until T325 expiry;
  if the RRCRelease includes suspendConfig:
    apply the received suspendConfig;
    store fullI-RNTI, shortI-RNTI, nextHopChainingCount, t380 and ran-PagingCycle
    provided in suspendConfig;
    reset MAC;
    re-establish RLC entities for SRB1;
    if the RRCRelease message with suspendConfig was received in response to an
    RRCResumeRequest or an RRCResumeRequest1:
      stop the timer T319 if running;
      replace any previously stored security context with newly received
      security context in the suspendConfig;
      replace the previously stored C-RNTI with the temporary C-RNTI in the
      cell the UE has received the RRCRelease message;
      replace the previously stored cellIdentity with the cellIdentity of the cell
      the UE has received the RRCRelease message;
      replace the previously stored physical cell identity with the physical cell
      identity of the cell the UE has received the RRCRelease message;
    else:
      store the UE AS Context including the current RRC configuration, the
      current security context, the PDCP state including ROHC state, SDAP
      configuration, C-RNTI used in the source PCell, the cellIdentity and the
      physical cell identity of the source PCell;
    suspend all SRB(s) and DRB(s), except SRB0;
    start timer T380, with the timer value set to t380;
    indicate the suspension of the RRC connection to upper layers;
    enter RRC_INACTIVE and perform procedures as specified in TS 38.304 [21]
  else
    perform the actions upon going to RRC_IDLE as specified in 5.3.11, with the
    release cause 'other'.
Editor's Note: FFS Whether there needs to be different release causes and actions associated.
******
5.3.1.4 5GMM-CONNECTED mode with RRC inactive indication
...
The UE shall transition from 5GMM-CONNECTED mode over 3GPP access to 5GMM-
CONNECTED mode with RRC inactive indication upon receiving an indication from the lower
layers that the UE has transitioned to RRC INACTIVE state.
Upon:
  a trigger of a procedure which requires sending of a NAS message; or
  an uplink user data packet to be sent for a PDU session with suspended user-plane
  resources;
the UE in 5GMM-CONNECTED mode with RRC inactive indication over 3GPP access shall
request the lower layers to transition to RRC CONNECTED state (see 3GPP TS 38.300 [27]).
The UE shall transition from 5GMM-CONNECTED mode with RRC inactive indication to
5GMM-CONNECTED mode over 3GPP access upon receiving an indication from the lower
layers that the UE has transitioned to RRC CONNECTED state (see 3GPP TS 38.300 [27]).
    NOTE: The AMF can be aware of the transition between 5GMM-CONNECTED
    mode and 5GMM-CONNECTED mode with RRC inactive indication for a UE (see
    3GPP TS 23.502 [9]).
```

End Excerpts from NAS Specifications

Although the NAS specification covers the cases where the UE moves from RRC_CONNECTED to RRC_INACTIVE state and from RRC_INACTIVE to RRC_CONNECTED state, the current NAS specification does not cover the case where the upper layers request a Resume Request when the UE is in RRC_INACTIVE and possibly receive a Release with redirect to RRC_IDLE (and in that case transition to 5GMM-IDLE) or RRC_INACTIVE (and in that case transition to 5GMM-CONNECTED with inactive indication). This scenario is illustrated in FIG. 10.

FIG. 10 illustrates an exemplary two-step process for release and redirect according to some embodiments of the present disclosure, showing the inability of a conventional NAS to handle this scenario. In the embodiment illustrated in FIG. 10, the following steps occur within a UE:

Step 1000: the upper layers/NAS requests that a suspended connection be resumed.

Step 1002: An RRCResumeRequestmessage is sent to the network by the AS.

Step 1004: An RRCRelease message is received from the network by the AS.

Step 1006: The upper layers are notified, but the conventional NAS does not know what to do with this information. FIGS. 11 and 12 illustrate embodiments which address this problem.

FIG. 11 illustrates an exemplary interaction between exemplary NAS and AS layers according to some embodiments of the present disclosure. In the embodiment illustrated in FIG. 11, upon receiving the message to enter RRC_INACTIVE with a redirect information after sending an RRC Resume Request, the UE informs the upper layers that it is being suspended (although it is already suspended). In some embodiments, upon the indication from lower layers of the suspension, upper layers will consider the UE still in MM-CONNECTED with inactive indication and consider the first request pending, by implicitly understanding that the UE was released with redirection information. After the UE performs cell selection, upper layers may again trigger the request. In the embodiment illustrated in FIG. 11, the following steps occur within a UE:

Step 1100: the upper layers/NAS requests that a suspended connection be resumed.

Step 1102: an RRCResumeRequest message is sent to the network by the AS.

Step 1104: an RRCResume message is received from the network by the AS.

Step 1106: the NAS considers the procedure pending.

Step 1108: the upper layers trigger the request again, e.g., upon cell selection.

FIG. 12 illustrates an exemplary interaction between exemplary NAS and AS layers according to some embodiments of the present disclosure. In the embodiment illustrated in FIG. 12, upon receiving the message to enter RRC_INACTIVE with a redirect information after sending an RRC Resume Request, the UE does inform upper layers that is being suspended (although it is already suspended) and indicates if a release and redirect information is included. Upon the indication from lower layers of the suspension with this redirection indication, upper layers will consider the UE still in MM-CONNECTED with inactive indication and consider the first request pending. After the UE performs cell selection, upper layers may again trigger the request. In the embodiment illustrated in FIG. 12, the following steps occur within a UE:

Step 1200: the upper layers/NAS requests that a suspended connection be resumed.

Step 1202: an RRCResumeRequest message is sent to the network by the AS.

Step 1204: an RRCRelease message is received from the network by the AS, the message including redirection information.

Step 1206: the AS considers the procedure pending and triggers the pending request upon cell reselection.

In yet other exemplary embodiments according to the present disclosure, pending requests to resume from upper layers are handled by the AS layer if the UE is redirected in a 2 steps procedure. In these embodiments, upon receiving the message to enter RRC_INACTIVE with a redirect information after sending an RRC Resume Request, the UE does NOT inform upper layers that is being suspended but considers the request from upper layers as still valid. Hence, upon performing cell selection according to the redirection information the UE triggers that pending resume request from upper layers. As the upper layers may expect a response in some time, the indication of a redirection from previous cases may be used to indicate to upper layers that the procedure should not be aborted.

Implementations of the Method in the Specifications

Some of the embodiments according to the present disclosure may be codified within 3GPP Specifications as shown below. New text is marked in bold underline.

One embodiment of the present disclosure may be codified a change in the RRC specifications, to clarify that the redirectedCarrierInfo in RRCRelease leading to cell selection may not necessarily lead to the procedure of leaving RRC_CONNECTED:

Begin Proposed Change 1 to RRC Specifications redirectedCarrierInfo
Indicates a carrier frequency (downlink for FDD) and is used to redirect the UE to an NR or an inter-RAT carrier frequency, by means of the cell selection upon leaving RRC_CONNECTED as specified in TS 38.304 [20], or upon going to RRC INACTIVE from RRC INACTIVE (two-step procedure) or from RRC IDLE, as specified in TS 38.304 [20].

End Proposed Change 1 to RRC Specifications

Another embodiment of the present disclosure may be codified a change in the Idle/Inactive specifications, to clarify that the redirectedCarrierInfo in RRCRelease leading to cell selection may not necessarily lead to the procedure of leaving RRC_CONNECTED:

Begin Proposed Change 2 to RRC Specifications

On transition from RRC_CONNECTED to RRC_IDLE state or RRC_INACTIVE state, or when remaining in RRC INACTIVE in a two-step procedure (i.e. UE is suspended without entering RRC CONNECTED), UE shall attempt to camp on a suitable cell according to redirectedCarrierInfo if included in the RRC message used for this transition. If the UE cannot find a suitable cell, the UE is allowed to camp on any suitable cell of the indicated RAT. If the RRC Release message does not contain the redirectedCarrierInfo, UE shall attempt to select a suitable cell on a NR carrier. If no suitable cell is found according to the above, the UE shall perform cell selection using stored information in order to find a suitable cell to camp on.
When returning to RRC_IDLE state after UE moved to RRC_CONNECTED state from camped on any cell state, UE shall attempt to camp on an acceptable cell according to redirectedCarrierInfo, if included in the RRC Release message. If the UE cannot find an acceptable cell, the UE is allowed to camp on any acceptable cell of the indicated RAT. If the RRC Release message does not contain redirectedCarrierInfo UE shall attempt to select an acceptable cell on a NR carrier. If no acceptable cell is found according to the above, the UE shall continue to search for an acceptable cell of any PLMN in state any cell selection.

End Proposed Change 2 to RRC Specifications

Another embodiment of the present disclosure may be codified as a change in the stage 2 specifications (TS 38.300), to clarify that the redirectedCarrierInfo in RRCRelease leading to cell selection may not necessarily lead to the procedure of leaving RRC_CONNECTED.

Begin Proposed Change 3 to RRC Specifications 9.2.2.5 Two-Step Resume Request/Release Procedure (e.g. RNA Update)
The following figure describes the UE triggered RNA update procedure when it moves out of the configured RNA involving context retrieval over Xn:

FIG. 9.2.2.5-1: RNA Update Procedure

1. The UE resumes from RRC_INACTIVE, providing the I-RNTI allocated by the last serving gNB and appropriate cause value ~~e.g., RAN notification area update~~.
2. The gNB, if able to resolve the gNB identity contained in the I-RNTI, requests the last serving gNB to provide UE Context.
3. The last serving gNB provides UE context.
4. The gNB may move the UE to RRC_CONNECTED, or send the UE back to RRC_INACTIVE state or send the UE to RRC_IDLE. If the UE is sent to RRC_IDLE, the following steps are not needed.
5. If loss of DL user data buffered in the last serving gNB shall be prevented, the gNB provides forwarding addresses.
6./7. The gNB performs path switch.
8. The gNB triggers the release of the UE resources at the last serving gNB.
The UE may receive an RRCRelease with redirect information in response to an RRCResumeRequest kind of message.

End Proposed Change to RRC Specifications

Additional Explanation

Figure 13:
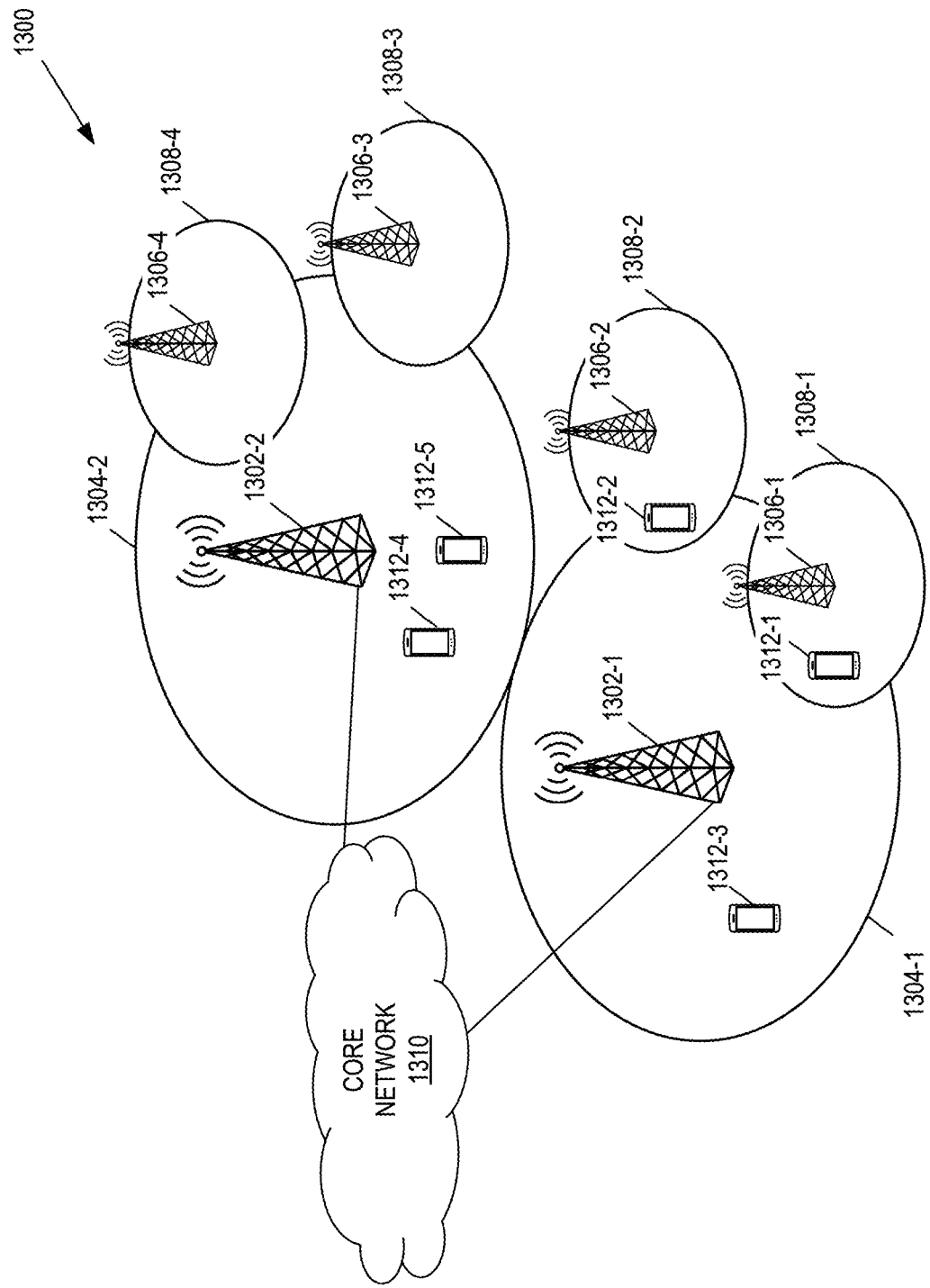
FIG. 13 illustrates one example of a cellular communications network according to some embodiments of the present disclosure.

FIG. 13 illustrates one example of a cellular communications network 1300 according to some embodiments of the present disclosure. In the embodiments described herein, the cellular communications network 1300 is a 5G NR network. In this example, the cellular communications network 1300 includes base stations 1302-1 and 1302-2, which in LTE are referred to as eNBs and in 5G NR are referred to as gNBs, controlling corresponding macro cells 1304-1 and 1304-2. The base stations 1302-1 and 1302-2 are generally referred to herein collectively as base stations 1302 and individually as base station 1302. Likewise, the macro cells 1304-1 and 1304-2 are generally referred to herein collectively as macro cells 1304 and individually as macro cell 1304. The cellular communications network 1300 may also include a number of low power nodes 1306-1 through 1306-4 controlling corresponding small cells 1308-1 through 1308-4. The low power nodes 1306-1 through 1306-4 can be small base stations (such as pico or femto base stations) or Remote Radio Heads (RRHs), or the like. Notably, while not illustrated, one or more of the small cells 1308-1 through 1308-4 may alternatively be provided by the base stations 1302. The low power nodes 1306-1 through 1306-4 are generally referred to herein collectively as low power nodes 1306 and individually as low power node 1306. Likewise, the small cells 1308-1 through 1308-4 are generally referred to herein collectively as small cells 1308 and individually as small cell 1308. The base stations 1302 (and optionally the low power nodes 1306) are connected to a core network 1310.

The base stations 1302 and the low power nodes 1306 provide service to wireless devices 1312-1 through 1312-5 in the corresponding cells 1304 and 1308. The wireless devices 1312-1 through 1312-5 are generally referred to herein collectively as wireless devices 1312 and individually as wireless device 1312. The wireless devices 1312 are also sometimes referred to herein as UEs.

Figure 14:
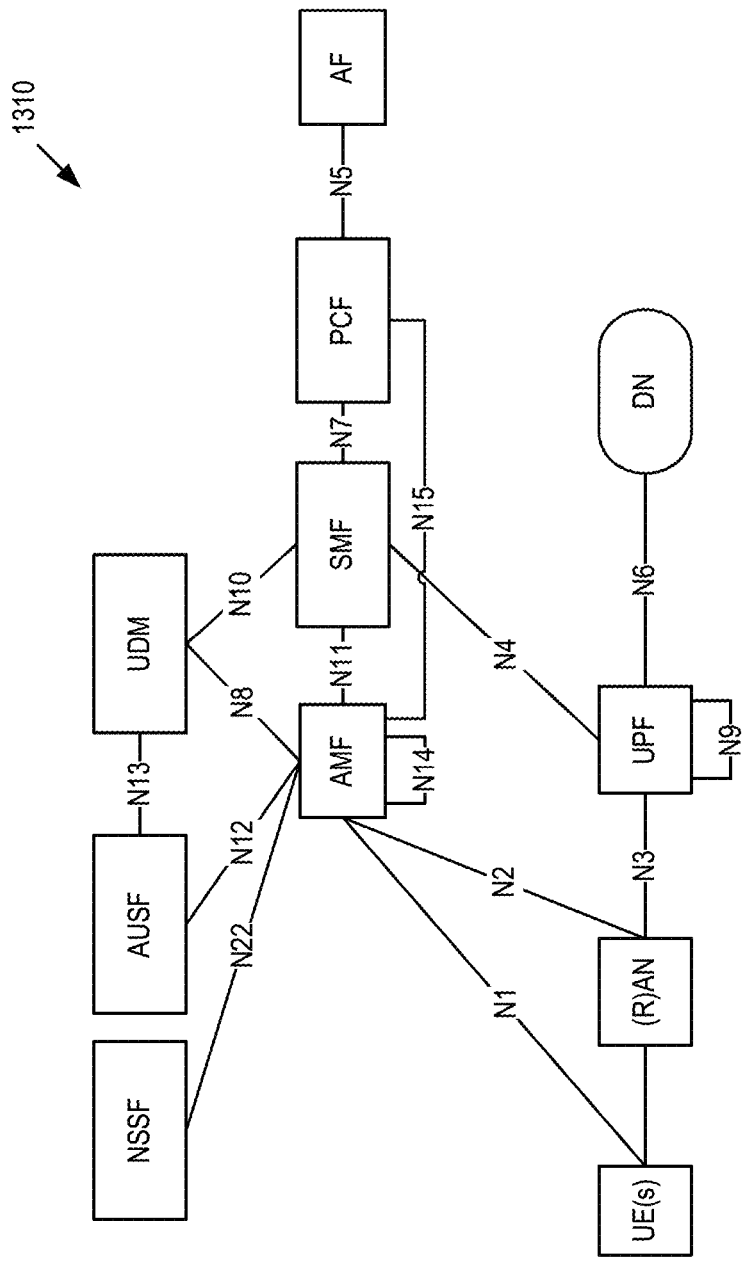
FIG. 14 illustrates a wireless communication system represented as a Fifth Generation (5G) network architecture composed of core Network Functions (NFs), where interaction between any two NFs is represented by a point-to-point reference point/interface.

FIG. 14 illustrates a wireless communication system represented as a 5G network architecture composed of core Network Functions (NFs), where interaction between any two NFs is represented by a point-to-point reference point/interface. FIG. 14 can be viewed as one particular implementation of the system 1300 of FIG. 13.

Seen from the access side the 5G network architecture shown in FIG. 14 comprises a plurality of User Equipment (UEs) connected to either a Radio Access Network (RAN) or an Access Network (AN) as well as an Access and Mobility Management Function (AMF). Typically, the R(AN) comprises base stations, e.g., such as evolved Node Bs (eNBs) or NR base stations (gNBs) or similar. Seen from the core network side, the 5G core NFs shown in FIG. 14 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 14, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 14. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 15:
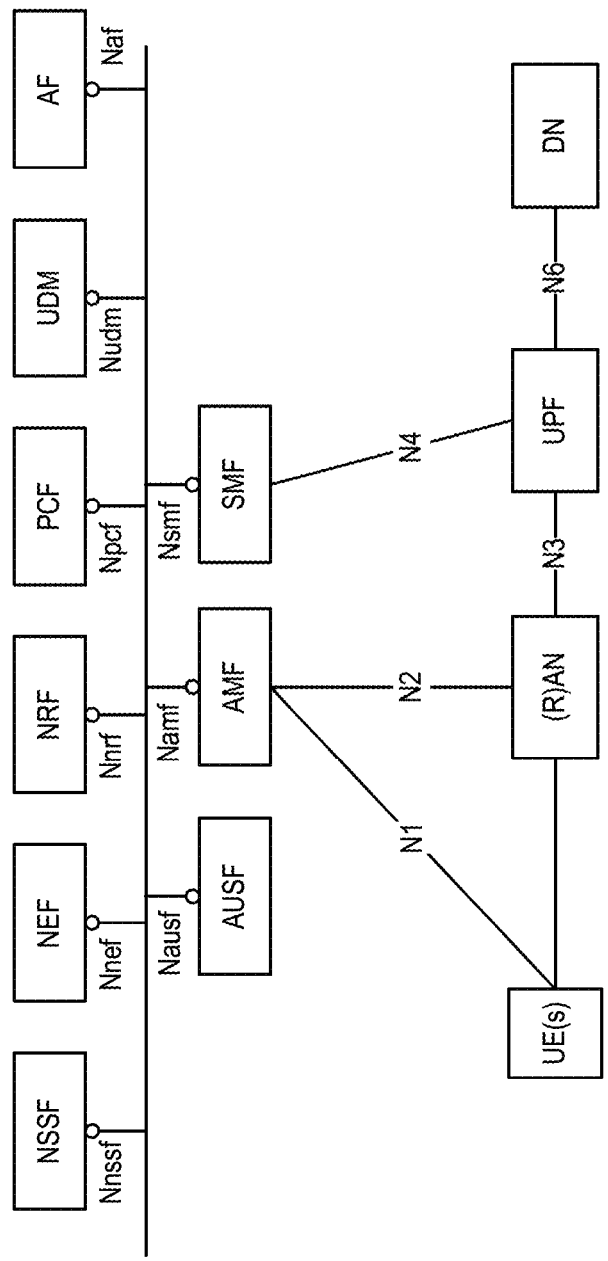
FIG. 15 illustrates a 5G network architecture using service-based interfaces between the NFs in the control plane.

FIG. 15 illustrates a 5G network architecture using service-based interfaces between the NFs in the control plane, instead of the point-to-point reference points/interfaces used in the 5G network architecture of FIG. 14. However, the NFs described above with reference to FIG. 14 correspond to the NFs shown in FIG. 15. The service(s) etc. that a NF provides to other authorized NFs can be exposed to the authorized NFs through the service-based interface. In FIG. 15 the service based interfaces are indicated by the letter "N" followed by the name of the NF, e.g., Namf for the service based interface of the AMF and Nsmf for the service based interface of the SMF etc. The Network Exposure Function (NEF) and the Network Repository Function (NRF) in FIG. 15 are not shown in FIG. 14 discussed above. However, it should be clarified that all NFs depicted in FIG. 14 can interact with the NEF and the NRF of FIG. 15 as necessary, though not explicitly indicated in FIG. 14.

Some properties of the NFs shown in FIGS. 14 and 15 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 16:
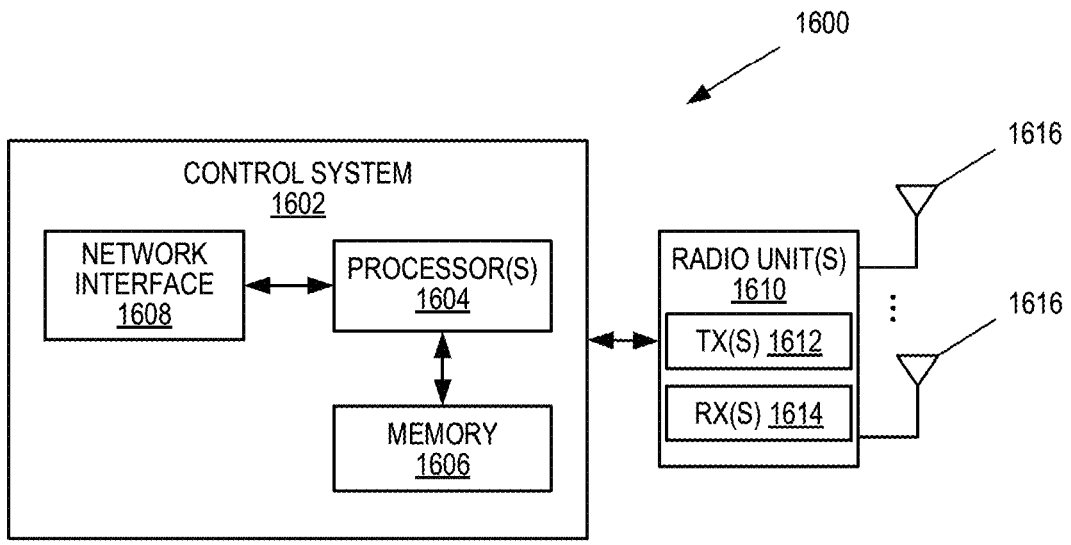
FIG. 16 is a schematic block diagram of a radio access node according to some embodiments of the present disclosure.

FIG. 16 is a schematic block diagram of a radio access node 1600 according to some embodiments of the present disclosure. The radio access node 1600 may be, for example, a base station 1302 or 1306. As illustrated, the radio access node 1600 includes a control system 1602 that includes one or more processors 1604 (e.g., Central Processing Units (CPUs), Application Specific Integrated Circuits (ASICs), Field Programmable Gate Arrays (FPGAs), and/or the like), memory 1606, and a network interface 1608. The one or more processors 1604 are also referred to herein as processing circuitry. In addition, the radio access node 1600 includes one or more radio units 1610 that each includes one or more transmitters 1612 and one or more receivers 1614 coupled to one or more antennas 1616. The radio units 1610 may be referred to or be part of radio interface circuitry. In some embodiments, the radio unit(s) 1610 is external to the control system 1602 and connected to the control system 1602 via, e.g., a wired connection (e.g., an optical cable). However, in some other embodiments, the radio unit(s) 1610 and potentially the antenna(s) 1616 are integrated together with the control system 1602. The one or more processors 1604 operate to provide one or more functions of a radio access node 1600 as described herein. In some embodiments, the function(s) are implemented in software that is stored, e.g., in the memory 1606 and executed by the one or more processors 1604.

Figure 17:
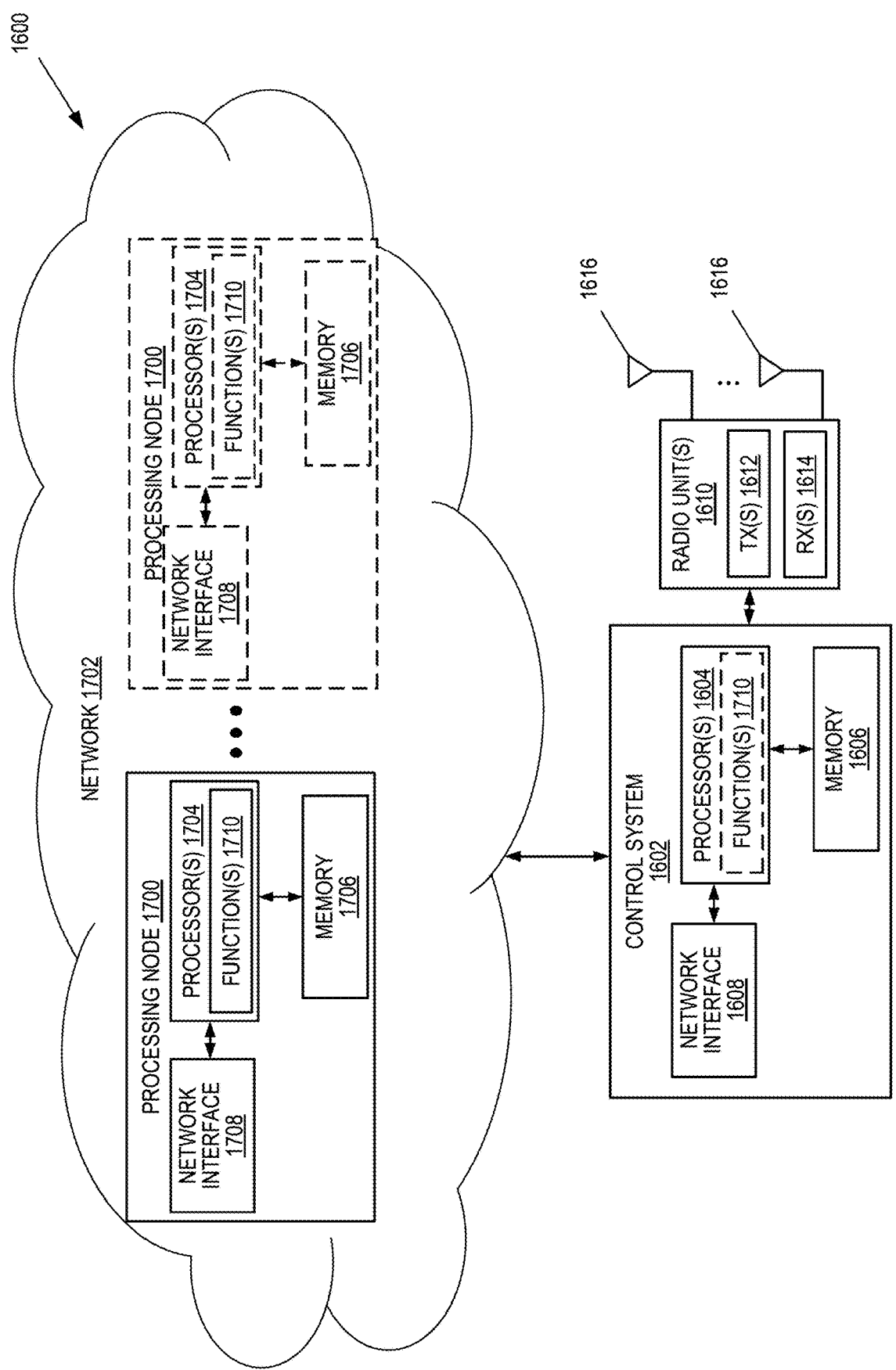
FIG. 17 is a schematic block diagram that illustrates a virtualized embodiment of a radio access node according to some embodiments of the present disclosure.

FIG. 17 is a schematic block diagram that illustrates a virtualized embodiment of the radio access node 1600 according to some embodiments of the present disclosure. This discussion is equally applicable to other types of network nodes. Further, other types of network nodes may have similar virtualized architectures.

As used herein, a "virtualized" radio access node is an implementation of the radio access node 1600 in which at least a portion of the functionality of the radio access node 1600 is implemented as a virtual component(s) (e.g., via a virtual machine(s) executing on a physical processing node(s) in a network(s)). As illustrated, in this example, the radio access node 1600 includes the control system 1602 that includes the one or more processors 1604 (e.g., CPUs, ASICs, FPGAs, and/or the like), the memory 1606, and the network interface 1608 and the one or more radio units 1610 that each includes the one or more transmitters 1612 and the one or more receivers 1614 coupled to the one or more antennas 1616, as described above. The control system 1602 is connected to the radio unit(s) 1610 via, for example, an optical cable or the like. The control system 1602 is connected to one or more processing nodes 1700 coupled to or included as part of a network(s) 1702 via the network interface 1608. Each processing node 1700 includes one or more processors 1704 (e.g., CPUs, ASICs, FPGAs, and/or the like), memory 1706, and a network interface 1708.

In this example, functions 1710 of the radio access node 1600 described herein are implemented at the one or more processing nodes 1700 or distributed across the control system 1602 and the one or more processing nodes 1700 in any desired manner. In some particular embodiments, some or all of the functions 1710 of the radio access node 1600 described herein are implemented as virtual components executed by one or more virtual machines implemented in a virtual environment(s) hosted by the processing node(s) 1700. As will be appreciated by one of ordinary skill in the art, additional signaling or communication between the processing node(s) 1700 and the control system 1602 is used in order to carry out at least some of the desired functions 1710. Notably, in some embodiments, the control system 1602 may not be included, in which case the radio unit(s) 1610 communicate directly with the processing node(s) 1700 via an appropriate network interface(s).

In some embodiments, a computer program including instructions which, when executed by at least one processor, causes the at least one processor to carry out the functionality of radio access node 1600 or a node (e.g., a processing node 1700) implementing one or more of the functions 1710 of the radio access node 1600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
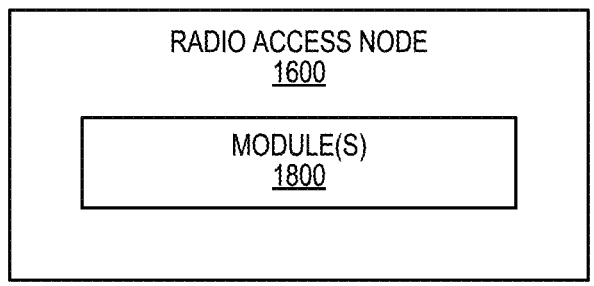
FIG. 18 is a schematic block diagram of a radio access node according to some other embodiments of the present disclosure.

FIG. 18 is a schematic block diagram of the radio access node 1600 according to some other embodiments of the present disclosure. The radio access node 1600 includes one or more modules 1800, each of which is implemented in software. The module(s) 1800 provide the functionality of the radio access node 1600 described herein. This discussion is equally applicable to the processing node 1700 of FIG. 17 where the modules 1800 may be implemented at one of the processing nodes 1700 or distributed across multiple processing nodes 1700 and/or distributed across the processing node(s) 1700 and the control system 1602.

Figure 19:
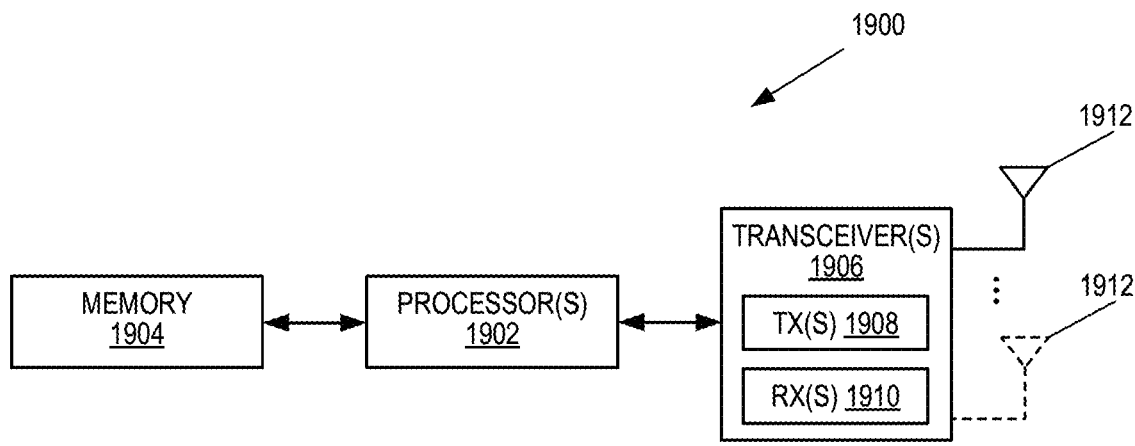
FIG. 19 is a schematic block diagram of a UE according to some embodiments of the present disclosure.

FIG. 19 is a schematic block diagram of a UE 1900 according to some embodiments of the present disclosure. As illustrated, the UE 1900 includes one or more processors 1902 (e.g., CPUs, ASICs, FPGAs, and/or the like), memory 1904, and one or more transceivers 1906 each including one or more transmitters 1908 and one or more receivers 1910 coupled to one or more antennas 1912. The transceiver(s) 1906 includes radio-front end circuitry connected to the antenna(s) 1912 that is configured to condition signals communicated between the antenna(s) 1912 and the processor(s) 1902, as will be appreciated by on of ordinary skill in the art. The processors 1902 are also referred to herein as processing circuitry. The transceivers 1906 are also referred to herein as radio circuitry. In some embodiments, the functionality of the UE 1900 described above may be fully or partially implemented in software that is, e.g., stored in the memory 1904 and executed by the processor(s) 1902. Note that the UE 1900 may include additional components not illustrated in FIG. 19 such as, e.g., one or more user interface components (e.g., an input/output interface including a display, buttons, a touch screen, a microphone, a speaker(s), and/or the like and/or any other components for allowing input of information into the UE 1900 and/or allowing output of information from the UE 1900), a power supply (e.g., a battery and associated power circuitry), etc.

In some embodiments, a computer program including instructions which, when executed by at least one processor, causes the at least one processor to carry out the functionality of the UE 1900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
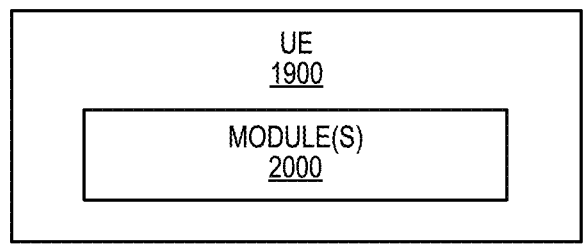
FIG. 20 is a schematic block diagram of the UE according to some other embodiments of the present disclosure.

FIG. 20 is a schematic block diagram of the UE 1900 according to some other embodiments of the present disclosure. The UE 1900 includes one or more modules 2000, each of which is implemented in software. The module(s) 2000 provide the functionality of the UE 1900 described herein.

Figure 21:
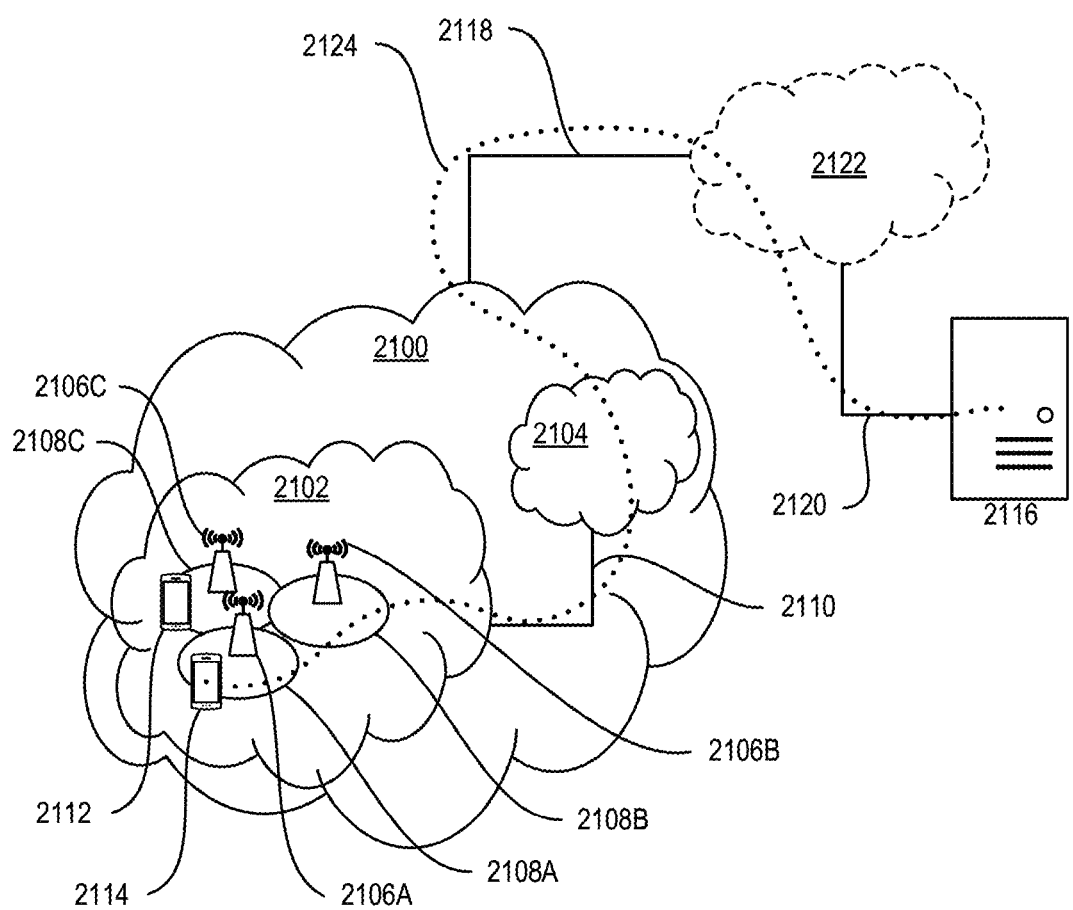
FIG. 21 illustrates a communication system according to some embodiments of the present disclosure.

FIG. 21 illustrates a communication system according to some embodiments of the present disclosure. With reference to FIG. 21, in accordance with an embodiment, a communication system includes a telecommunication network 2100, such as a 3GPP-type cellular network, which comprises an access network 2102, such as a RAN, and a core network 2104. The access network 2102 comprises a plurality of base stations 2106A, 2106B, 2106C, such as NBs, eNBs, gNBs, or other types of wireless Access Points (APs), each defining a corresponding coverage area 2108A, 2108B, 2108C. Each base station 2106A, 2106B, 2106C is connectable to the core network 2104 over a wired or wireless connection 2110. A first UE 2112 located in coverage area 2108C is configured to wirelessly connect to, or be paged by, the corresponding base station 2106C. A second UE 2114 in coverage area 2108A is wirelessly connectable to the corresponding base station 2106A. While a plurality of UEs 2112, 2114 are illustrated in this example, the disclosed embodiments are equally applicable to a situation where a sole UE is in the coverage area or where a sole UE is connecting to the corresponding base station 2106.

The telecommunication network 2100 is itself connected to a host computer 2116, which may be embodied in the hardware and/or software of a standalone server, a cloud-implemented server, a distributed server, or as processing resources in a server farm. The host computer 2116 may be under the ownership or control of a service provider, or may be operated by the service provider or on behalf of the service provider. Connections 2118 and 2120 between the telecommunication network 2100 and the host computer 2116 may extend directly from the core network 2104 to the host computer 2116 or may go via an optional intermediate network 2122. The intermediate network 2122 may be one of, or a combination of more than one of, a public, private, or hosted network; the intermediate network 2122, if any, may be a backbone network or the Internet; in particular, the intermediate network 2122 may comprise two or more sub-networks (not shown).

The communication system of FIG. 21 as a whole enables connectivity between the connected UEs 2112, 2114 and the host computer 2116. The connectivity may be described as an Over-the-Top (OTT) connection 2124. The host computer 2116 and the connected UEs 2112, 2114 are configured to communicate data and/or signaling via the OTT connection 2124, using the access network 2102, the core network 2104, any intermediate network 2122, and possible further infrastructure (not shown) as intermediaries. The OTT connection 2124 may be transparent in the sense that the participating communication devices through which the OTT connection 2124 passes are unaware of routing of uplink and downlink communications. For example, the base station 2106 may not or need not be informed about the past routing of an incoming downlink communication with data originating from the host computer 2116 to be forwarded (e.g., handed over) to a connected UE 2112. Similarly, the base station 2106 need not be aware of the future routing of an outgoing uplink communication originating from the UE 2112 towards the host computer 2116.

Figure 22:
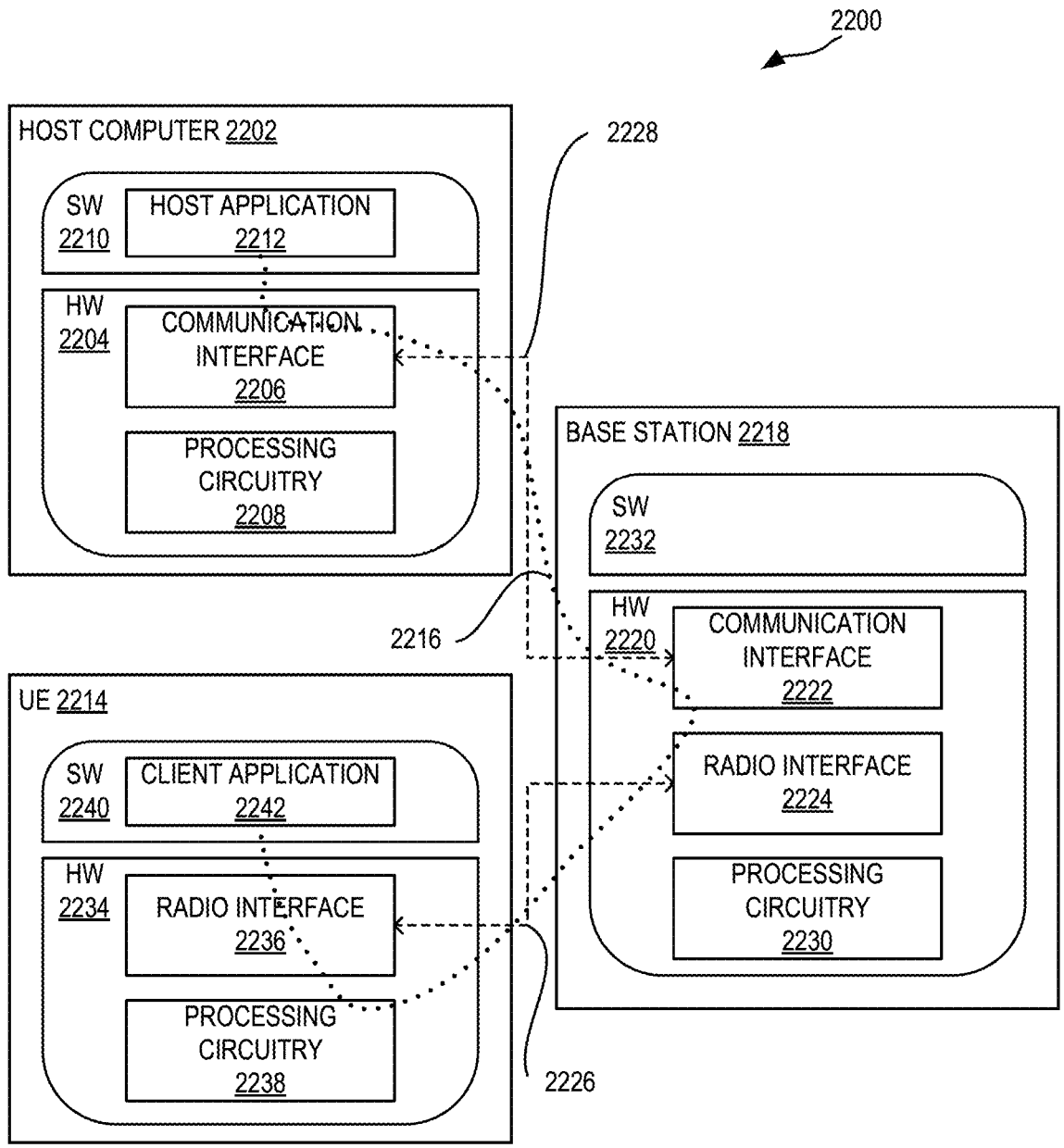
FIG. 22 illustrates a communication system according to some other embodiments of the present disclosure.

FIG. 22 illustrates a communication system according to some other embodiments of the present disclosure. Example implementations, in accordance with an embodiment, of the UE, base station, and host computer discussed in the preceding paragraphs will now be described with reference to FIG. 22. In a communication system 2200, a host computer 2202 comprises hardware 2204 including a communication interface 2206 configured to set up and maintain a wired or wireless connection with an interface of a different communication device of the communication system 2200. The host computer 2202 further comprises processing circuitry 2208, which may have storage and/or processing capabilities. In particular, the processing circuitry 2208 may comprise one or more programmable processors, ASICs, FPGAs, or combinations of these (not shown) adapted to execute instructions. The host computer 2202 further comprises software 2210, which is stored in or accessible by the host computer 2202 and executable by the processing circuitry 2208. The software 2210 includes a host application 2212. The host application 2212 may be operable to provide a service to a remote user, such as a UE 2214 connecting via an OTT connection 2216 terminating at the UE 2214 and the host computer 2202. In providing the service to the remote user, the host application 2212 may provide user data which is transmitted using the OTT connection 2216.

The communication system 2200 further includes a base station 2218 provided in a telecommunication system and comprising hardware 2220 enabling it to communicate with the host computer 2202 and with the UE 2214. The hardware 2220 may include a communication interface 2222 for setting up and maintaining a wired or wireless connection with an interface of a different communication device of the communication system 2200, as well as a radio interface 2224 for setting up and maintaining at least a wireless connection 2226 with the UE 2214 located in a coverage area (not shown in FIG. 22) served by the base station 2218. The communication interface 2222 may be configured to facilitate a connection 2228 to the host computer 2202. The connection 2228 may be direct or it may pass through a core network (not shown in FIG. 22) of the telecommunication system and/or through one or more intermediate networks outside the telecommunication system. In the embodiment shown, the hardware 2220 of the base station 2218 further includes processing circuitry 2230, which may comprise one or more programmable processors, ASICs, FPGAs, or combinations of these (not shown) adapted to execute instructions. The base station 2218 further has software 2232 stored internally or accessible via an external connection.

The communication system 2200 further includes the UE 2214 already referred to. The UE's 2214 hardware 2234 may include a radio interface 2236 configured to set up and maintain a wireless connection 2226 with a base station serving a coverage area in which the UE 2214 is currently located. The hardware 2234 of the UE 2214 further includes processing circuitry 2238, which may comprise one or more programmable processors, ASICs, FPGAs, or combinations of these (not shown) adapted to execute instructions. The UE 2214 further comprises software 2240, which is stored in or accessible by the UE 2214 and executable by the processing circuitry 2238. The software 2240 includes a client application 2242. The client application 2242 may be operable to provide a service to a human or non-human user via the UE 2214, with the support of the host computer 2202. In the host computer 2202, the executing host application 2212 may communicate with the executing client application 2242 via the OTT connection 2216 terminating at the UE 2214 and the host computer 2202. In providing the service to the user, the client application 2242 may receive request data from the host application 2212 and provide user data in response to the request data. The OTT connection 2216 may transfer both the request data and the user data. The client application 2242 may interact with the user to generate the user data that it provides.

It is noted that the host computer 2202, the base station 2218, and the UE 2214 illustrated in FIG. 22 may be similar or identical to the host computer 2116, one of the base stations 2106A, 2106B, 2106C, and one of the UEs 2112, 2114 of FIG. 21, respectively. This is to say, the inner workings of these entities may be as shown in FIG. 22 and independently, the surrounding network topology may be that of FIG. 21.

In FIG. 22, the OTT connection 2216 has been drawn abstractly to illustrate the communication between the host computer 2202 and the UE 2214 via the base station 2218 without explicit reference to any intermediary devices and the precise routing of messages via these devices. The network infrastructure may determine the routing, which may be configured to hide from the UE 2214 or from the service provider operating the host computer 2202, or both. While the OTT connection 2216 is active, the network infrastructure may further take decisions by which it dynamically changes the routing (e.g., on the basis of load balancing consideration or reconfiguration of the network).

The wireless connection 2226 between the UE 2214 and the base station 2218 is in accordance with the teachings of the embodiments described throughout this disclosure. One or more of the various embodiments improve the performance of OTT services provided to the UE 2214 using the OTT connection 2216, in which the wireless connection 2226 forms the last segment. More precisely, the teachings of these embodiments may reduce the time required to perform a release and redirect for a UE that is in the RRC_INACTIVE state and thereby provide benefits such as improved responsiveness of the UE, reduced signaling between the UE and network entities, and reduced power consumption by the UE.

A measurement procedure may be provided for the purpose of monitoring data rate, latency, and other factors on which the one or more embodiments improve. There may further be an optional network functionality for reconfiguring the OTT connection 2216 between the host computer 2202 and the UE 2214, in response to variations in the measurement results. The measurement procedure and/or the network functionality for reconfiguring the OTT connection 2216 may be implemented in the software 2210 and the hardware 2204 of the host computer 2202 or in the software 2240 and the hardware 2234 of the UE 2214, or both. In some embodiments, sensors (not shown) may be deployed in or in association with communication devices through which the OTT connection 2216 passes; the sensors may participate in the measurement procedure by supplying values of the monitored quantities exemplified above, or supplying values of other physical quantities from which the software 2210, 2240 may compute or estimate the monitored quantities. The reconfiguring of the OTT connection 2216 may include message format, retransmission settings, preferred routing, etc.; the reconfiguring need not affect the base station 2218, and it may be unknown or imperceptible to the base station 2218. Such procedures and functionalities may be known and practiced in the art. In certain embodiments, measurements may involve proprietary UE signaling facilitating the host computer 2202's measurements of throughput, propagation times, latency, and the like. The measurements may be implemented in that the software 2210 and 2240 causes messages to be transmitted, in particular empty or 'dummy' messages, using the OTT connection 2216 while it monitors propagation times, errors, etc.

Figures 23, 24:
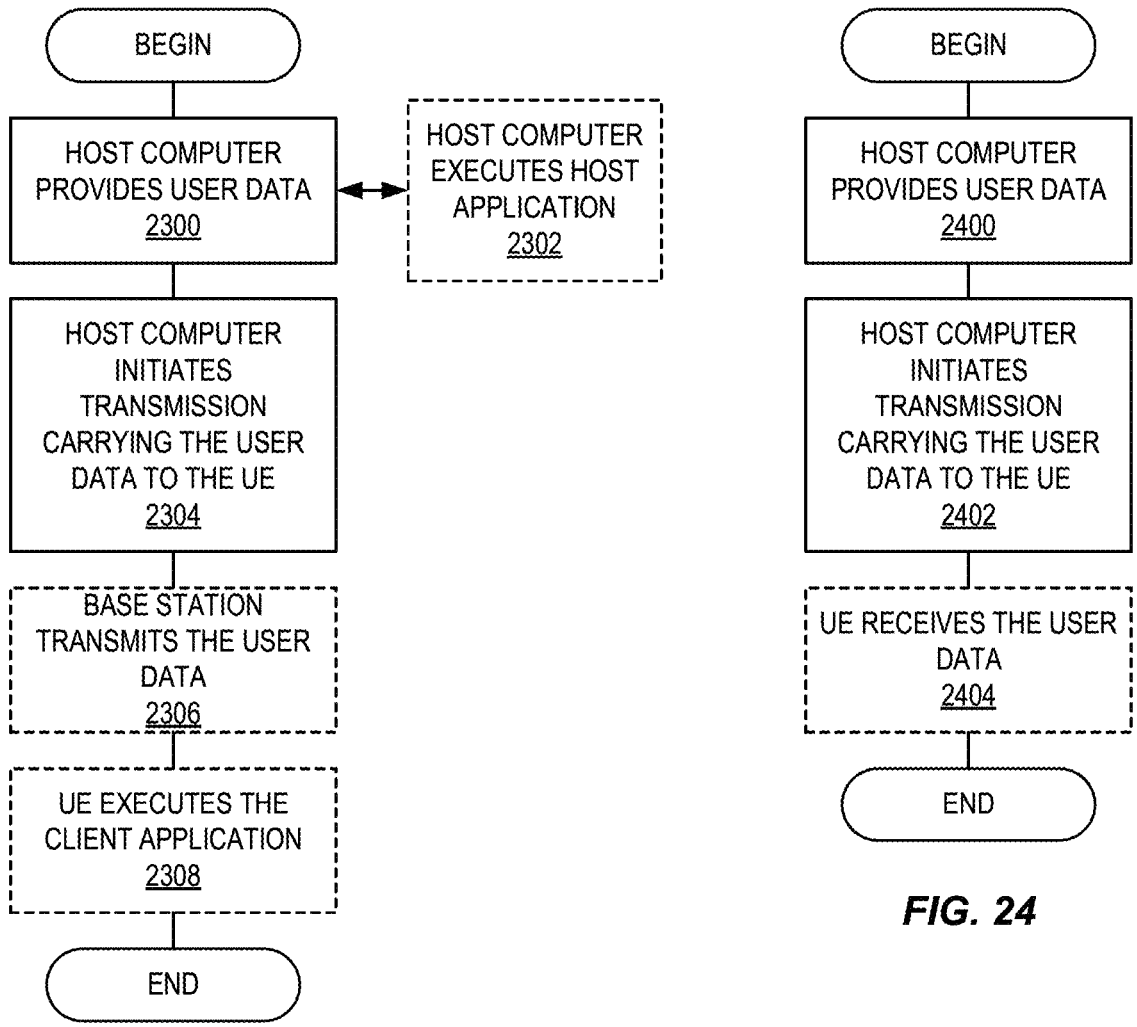
FIG. 23 is a flowchart illustrating a method implemented in a communication system, in accordance with some embodiments of the present disclosure.
FIG. 24 is a flowchart illustrating a method implemented in a communication system, in accordance with some embodiments of the present disclosure.

FIG. 23 is a flowchart illustrating a method implemented in a communication system, in accordance with some embodiments of the present disclosure. The communication system includes a host computer, a base station, and a UE which may be those described with reference to FIGS. 21 and 22. For simplicity of the present disclosure, only drawing references to FIG. 23 will be included in this section. In step 2300, the host computer provides user data. In sub-step 2302 (which may be optional) of step 2300, the host computer provides the user data by executing a host application. In step 2304, the host computer initiates a transmission carrying the user data to the UE. In step 2306 (which may be optional), the base station transmits to the UE the user data which was carried in the transmission that the host computer initiated, in accordance with the teachings of the embodiments described throughout this disclosure. In step 2308 (which may also be optional), the UE executes a client application associated with the host application executed by the host computer.

FIG. 24 is a flowchart illustrating a method implemented in a communication system, in accordance with some embodiments of the present disclosure. The communication system includes a host computer, a base station, and a UE which may be those described with reference to FIGS. 21 and 22. For simplicity of the present disclosure, only drawing references to FIG. 24 will be included in this section. In step 2400 of the method, the host computer provides user data. In an optional sub-step (not shown) the host computer provides the user data by executing a host application. In step 2402, the host computer initiates a transmission carrying the user data to the UE. The transmission may pass via the base station, in accordance with the teachings of the embodiments described throughout this disclosure. In step 2404 (which may be optional), the UE receives the user data carried in the transmission.

FIG. 25 is a flowchart illustrating a method implemented in a communication system, in accordance with some embodiments of the present disclosure. The communication system includes a host computer, a base station, and a UE which may be those described with reference to FIGS. 21 and 22. For simplicity of the present disclosure, only drawing references to FIG. 25 will be included in this section. In step 2500 (which may be optional), the UE receives input data provided by the host computer. Additionally or alternatively, in step 2502, the UE provides user data. In sub-step 2504 (which may be optional) of step 2500, the UE provides the user data by executing a client application. In sub-step 2506 (which may be optional) of step 2502, the UE executes a client application which provides the user data in reaction to the received input data provided by the host computer. In providing the user data, the executed client application may further consider user input received from the user. Regardless of the specific manner in which the user data was provided, the UE initiates, in sub-step 2508 (which may be optional), transmission of the user data to the host computer. In step 2510 of the method, the host computer receives the user data transmitted from the UE, in accordance with the teachings of the embodiments described throughout this disclosure.

FIG. 26 is a flowchart illustrating a method implemented in a communication system, in accordance with some embodiments of the present disclosure. The communication system includes a host computer, a base station, and a UE which may be those described with reference to FIGS. 21 and 22. For simplicity of the present disclosure, only drawing references to FIG. 26 will be included in this section. In step 2600 (which may be optional), in accordance with the teachings of the embodiments described throughout this disclosure, the base station receives user data from the UE. In step 2602 (which may be optional), the base station initiates transmission of the received user data to the host computer. In step 2604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

The following exemplary embodiments of the present disclosure are illustrative and not limiting.

Group A Embodiments

1. A method performed by a UE for communicating within a telecommunications network, the method comprising: while in an RRC_INACTIVE state, sending, to a base station, a request to resume communication, and, without entering the RRC_CONNECTED state, receiving, from the base station, an instruction to release and redirect; and, in response to receiving the instruction to release and redirect, performing cell selection in a RAT and attempting to resume communication with the selected cell.

2. The method of embodiment 1 wherein the request to resume communication comprises an RRCResumeRequest message.

3. The method of embodiment 1 or 2 wherein the instruction to release and redirect comprises an RRCRelease message.

4. The method of any of embodiments 1-3 wherein the instruction to release and redirect identifies the RAT in which cell selection is to be performed.

5. The method of any of embodiments 1-4 wherein the RAT in which cell selection is to be performed comprises a NR frequency or LTE frequency.

Group B Embodiments

6. A method performed by a base station for communicating with UE within a telecommunication network, the method comprising: receiving, from a UE in an RRC_INACTIVE state, a request to resume communication; and in response to receiving the request to resume communication, and without first sending to the UE an instruction to resume, sending, to the UE, an instruction to release and redirect.

7. The method of embodiment 6 wherein the request to resume communication comprises an RRCResumeRequest message.

8. The method of embodiment 6 or 7 wherein the instruction to release and redirect comprises an RRCRelease message.

9. The method of any of embodiments 6-8 wherein the instruction to release and redirect identifies a RAT in which cell selection is to be performed.

10. The method of any of embodiments 6-9 wherein the RAT in which cell selection is to be performed comprises a NR frequency or a LTE frequency.

11. The method of any of embodiments 6-10 further comprising, prior to sending the instruction to release and redirect, performing a context relocation.

12. The method of embodiment 12 wherein performing a context relocation further comprises the steps of: retrieving, from a last serving base station, a context associated with the UE; sending, to an AMF a path switch request; and receiving, from the AMF, a path switch request response.

13. The method of embodiment 11 or 12 further comprising, after sending the instruction to release and redirect, sending, to the last serving base station, an instruction to release the UE context.

Group C Embodiments

14. A wireless device for communicating within a telecommunications network, the wireless device comprising: processing circuitry configured to perform any of the steps of any of the Group A embodiments; and power supply circuitry configured to supply power to the wireless device.

15. A base station for communicating with UEs within a telecommunication network, the base station comprising: processing circuitry configured to perform any of the steps of any of the Group B embodiments; and power supply circuitry configured to supply power to the base station.

16. A UE for communicating within a telecommunications network, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

17. A communication system including a host computer comprising: processing circuitry configured to provide user data; and a communication interface configured to forward the user data to a cellular network for transmission to a UE; wherein the cellular network comprises a base station having a radio interface and processing circuitry, the base station's processing circuitry configured to perform any of the steps of any of the Group B embodiments.

18. The communication system of the previous embodiment further including the base station.

19. The communication system of the previous 2 embodiments, further including the UE, wherein the UE is configured to communicate with the base station.

20. The communication system of the previous 3 embodiments, wherein: the processing circuitry of the host computer is configured to execute a host application, thereby providing the user data; and the UE comprises processing circuitry configured to execute a client application associated with the host application.

21. A method implemented in a communication system including a host computer, a base station, and a UE the method comprising: at the host computer, providing user data; and at the host computer, initiating a transmission carrying the user data to the UE via a cellular network comprising the base station, wherein the base station performs any of the steps of any of the Group B embodiments.

22 The method of the previous embodiment, further comprising, at the base station, transmitting the user data.

23. The method of the previous 2 embodiments, wherein the user data is provided at the host computer by executing a host application, the method further comprising, at the UE, executing a client application associated with the host application.

24. A UE configured to communicate with a base station, the UE comprising a radio interface and processing circuitry configured to perform the method of the previous 3 embodiments.

25. A communication system including a host computer comprising: processing circuitry configured to provide user data; and a communication interface configured to forward user data to a cellular network for transmission to a UE; wherein the UE comprises a radio interface and processing circuitry, the UE's components configured to perform any of the steps of any of the Group A embodiments.

26. The communication system of the previous embodiment, wherein the cellular network further includes a base station configured to communicate with the UE.

27. The communication system of the previous 2 embodiments, wherein: the processing circuitry of the host computer is configured to execute a host application, thereby providing the user data; and the UE's processing circuitry is configured to execute a client application associated with the host application.

28. A method implemented in a communication system including a host computer, a base station, and a UE, the method comprising: at the host computer, providing user data; and at the host computer, initiating a transmission carrying the user data to the UE via a cellular network comprising the base station, wherein the UE performs any of the steps of any of the Group A embodiments.

29. The method of the previous embodiment, further comprising at the UE, receiving the user data from the base station.

30. A communication system including a host computer comprising: communication interface configured to receive user data originating from a transmission from a UE to a base station; wherein the UE comprises a radio interface and processing circuitry, the UE's processing circuitry configured to perform any of the steps of any of the Group A embodiments.

31. The communication system of the previous embodiment, further including the UE.

32. The communication system of the previous 2 embodiments, further including the base station, wherein the base station comprises a radio interface configured to communicate with the UE and a communication interface configured to forward to the host computer the user data carried by a transmission from the UE to the base station.

33. The communication system of the previous 3 embodiments, wherein: the processing circuitry of the host computer is configured to execute a host application; and the UE's processing circuitry is configured to execute a client application associated with the host application, thereby providing the user data.

34. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

35. A method implemented in a communication system including a host computer, a base station, and a UE, the method comprising: at the host computer, receiving user data transmitted to the base station from the UE, wherein the UE performs any of the steps of any of the Group A embodiments.

36. The method of the previous embodiment, further comprising, at the UE, providing the user data to the base station.

37. The method of the previous 2 embodiments, further comprising: at the UE, executing a client application, thereby providing the user data to be transmitted; and at the host computer, executing a host application associated with the client application.

38. The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

39. A communication system including a host computer comprising a communication interface configured to receive user data originating from a transmission from a UE to a base station, wherein the base station comprises a radio interface and processing circuitry, the base station's processing circuitry configured to perform any of the steps of any of the Group B embodiments.

40. The communication system of the previous embodiment further including the base station.

41. The communication system of the previous 2 embodiments, further including the UE, wherein the UE is configured to communicate with the base station.

42. The communication system of the previous 3 embodiments, wherein: the processing circuitry of the host computer is configured to execute a host application; and the UE is configured to execute a client application associated with the host application, thereby providing the user data to be received by the host computer.

43. A method implemented in a communication system including a host computer, a base station, and a UE the method comprising: at the host computer, receiving, from the base station, user data originating from a transmission which the base station has received from the UE, wherein the UE performs any of the steps of any of the Group A embodiments.

44. The method of the previous embodiment, further comprising at the base station, receiving the user data from the UE.

45. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3G Third Generation
3GPP Third Generation Partnership Project
4G Fourth Generation
5G Fifth Generation
5GS Fifth Generation System
5GMM Fifth Generation System Mobility Management
5GC Fifth Generation Core Network
5G-S-TMSI Fifth Generation-System Architecture Evolution-Temporary Mobile Subscriber Identity
AF Application Function
AMF Access and Mobility Management Function
AN Access Network
AP Access Point
ARFCN Absolute Radio Frequency Channel Number
AS Access Stratum
ASIC Application Specific Integrated Circuit
AUSF Authentication Server Function
CA Carrier Aggregation
CN Core Network
CPU Central Processing Unit
C-RNTI Cell Radio Network Temporary Identifier
DC Dual Connectivity
DL Downlink
DN Data Network
DRB Data Radio Bearer
DRX Discontinuous Reception
DSP Digital Signal Processor
eNB Enhanced or Evolved Node B
EPC Enhanced or Evolved Packet Core
E-UTRA Evolved Universal Terrestrial Radio Access
E-UTRAN Evolved Universal Terrestrial Radio Access Network
FDD Frequency Division Duplexing
FFS For Further Study
FPGA Field Programmable Gate Array
gNB New Radio Base Station
ID Identifier/Identity
IP Internet Protocol
I-RNTI Radio Network Temporary Identifier for RRC_I-NACTIVE state
LS Liaison Statement
LTE Long Term Evolution
MA Movement Authority
MAC Medium Access Control
MCG Master Cell Group
MCS Mission Critical Support
MME Mobility Management Entity
MO Mobile Originated
MPS Multimedia Priority Service
MT Mobile Terminated
MTC Machine Type Communication
NAS Non-Access Stratum
NB Narrowband
NCC Next-hop Chaining Counter
NEF Network Exposure Function
NF Network Function
NH Next Hop
NR New Radio
NRF Network Repository Function
NSSF Network Slice Selection Function
OTT Over-the-Top
PCell Primary Cell
PCF Policy Control Function
PDCP Packet Data Convergence Protocol
PDU Protocol Data Unit
P-GW Packet Data Network Gateway
PLMN Public Land Mobile Network
QoS Quality of Service
RAM Random Access Memory
RAN Radio Access Network
RAT Radio Access Technology
RLC Radio Link Control
RNA Radio Network Subsystem Application Part User Adaption
RNAU Radio Network Subsystem Application Part User Adaption Update
RNTI Radio Network Temporary Identifier
ROHC Robust Header Compression
ROM Read Only Memory
RRC Radio Resource Control
RRH Remote Radio Head
RU Round Trip Time
SAE System Architecture Evolution
SAP Service Access Point
SCEF Service Capability Exposure Function
SCell Secondary Cell
SCG Secondary Cell Group
SDAP Service Data Adaptation Protocol
SMF Session Management Function
SMS Short Message Service
SpCell Special Cell
SRB Signaling Radio Bearer
TMSI Temporary Mobile Subscriber Identity TS Technical Specification
UDM Unified Data Management
UE User Equipment
UTRA Universal Terrestrial Radio Access
UTRAN Universal Terrestrial Radio Access Network
VoIP Voice over Internet Protocol
X2AP X2 interface Application Protocol
XnAP Xn interface Application Protocol Those skilled in the art will recognize improvements and modifications to the embodiments of the present disclosure. All such improvements and modifications are considered within the scope of the concepts disclosed herein.

What is claimed is:

1. A communication system including a host computer comprising:
    processing circuitry configured to provide user data; and
    a communication interface configured to initiate transmission of the user data to a communication network for transmission to a user equipment (UE) wherein the communication network comprises at least one base station having a radio interface and base station processing circuitry, the base station processing circuitry configured to:
        receive, from the UE in a Radio Resource Control (RRC) INACTIVE state, a request to resume communication; and
        in response to receiving the request to resume communication, and
        without first sending to the UE an RRC resume response, send, to the UE that has not left the RRC INACTIVE state, an instruction to release and redirect that comprises an RRCRelease message.

2. The communication system of claim 1 wherein the request to resume communication comprises an RRCResumeRequest message, and the instruction to release and redirect comprises an RRCRelease message.

3. The communication system of claim 1, wherein the instruction to release and redirect identifies a Radio Access Technology (RAT) in which cell selection is to be performed.

4. The communication system of claim 1, wherein a Radio Access Technology (RAT) in which cell selection is to be performed comprises a New Radio (NR) frequency or a Long Term Evolution (LTE) frequency.

5. A method implemented in a communication system including a host computer, one or more base stations and a user equipment (UE) comprising:
    at the host computer, providing user data; and
    at the host computer, initiating a transmission carrying the user data to the UE via a cellular network comprising the one or more base stations wherein at least one of the one or more base stations is configured to:
        receive, from the UE in a Radio Resource Control (RRC) INACTIVE state, a request to resume communication; and
        in response to receiving the request to resume communication, and without first sending to the UE an RRC resume response, send, to the UE that has not left the RRC INACTIVE state, an instruction to release and redirect that comprises and RRCRelease message.

6. The method of claim 5, wherein the request to resume communication comprises an RRCResumeRequest message, and the instruction to release and redirect comprises an RRCRelease message.

7. The method of claim 5, wherein the instruction to release and redirect identifies a Radio Access Technology (RAT) in which cell selection is to be performed.

8. The method of claim 5, wherein a Radio Access Technology (RAT) in which cell selection is to be performed comprises a New Radio (NR) frequency or a Long Term Evolution (LTE) frequency.

* * * * *